(12) United States Patent
Summersgill et al.

(10) Patent No.: US 6,341,190 B1
(45) Date of Patent: Jan. 22, 2002

(54) ORGANIC OPTICAL COMPONENTS AND PREPARATION THEREOF

(75) Inventors: Philip Summersgill, Redcar; Thomas Harvey Grierson, Middlesbrough; Timothy George Ryan, Middlesbrough; Neil Carter, Middlesbrough, all of (GB)

(73) Assignee: Epigem Limited, Cleveland (GB)

( * ) Notice: Subject to any disclaimer, the term of this patent is extended or adjusted under 35 U.S.C. 154(b) by 0 days.

(21) Appl. No.: 09/441,703

(22) Filed: Nov. 16, 1999

(30) Foreign Application Priority Data

Oct. 1, 1993 (GB) ............................................. 9320326

(51) Int. Cl.⁷ ................................................. G02B 6/10

(52) U.S. Cl. ........................ 385/130; 385/131; 385/132

(58) Field of Search ................................. 385/129–132, 385/141–145; 252/646, 582; 430/281.1, 270.1, 290

(56) References Cited

U.S. PATENT DOCUMENTS

| | | | |
|---|---|---|---|
| 4,547,040 A | 10/1985 | Yamamoto et al. | 385/143 |
| 4,593,974 A | 6/1986 | Yamamoto et al. | 385/132 |
| 5,113,471 A | 5/1992 | Inaishi et al. | 385/126 |
| 5,136,678 A | 8/1992 | Yoshimura | 385/132 |
| 5,171,392 A | 12/1992 | Iida et al. | 156/273.3 |
| 5,265,184 A | 11/1993 | Lebby et al. | 385/132 |
| 5,265,185 A * | 11/1993 | Ashley | 385/132 |
| 5,455,883 A | 10/1995 | Shigeta et al. | 385/129 |

FOREIGN PATENT DOCUMENTS

EP 0 420 592 A1 4/1991

OTHER PUBLICATIONS

Danberg, P. et al., Passive Polymeric Components Fabriacted by Embossing Technique, European Conference on Optical Communications, Montreux 1993, pp. 437–440.

Neyer, A. et al., Low Cost Fabrication Technology for Low Loss Passive Polymer Waveguides at 1300 nm and 1550 nm, Proceedings of European Conference on Optical Communications, Montreux, pp. 337–340.

Pahlke, W. et al., Industrial Application of Microsystem Technology, Technisches Messen 60, pp. 338–339, 1993.

Baraldi, M.T. et al., Fabrication of Single–Mode Ridge Waveguide Structures by Embossing into Polycarbonate on Glass, Proc. Of the 18$^{th}$ European Conference on Optical Communications (EPOC), pp. 561–564, 1992.

Rogner, Arnd et al., Fabrication of Light Guiding Devices and Fiber Coupling Structures by the LIGA Process, SPIE vol. 1506 Micro–Optics II, pp. 80–91, 1991.

Booth, B.L. et al., Waveguide Properties and Devices in Photopolymer, Heatwave Technol. vol. 7 No. 10, pp. 589–590, 1988.

Booth, B.L. et al., Polymer Technology for Passive Integrated Optic Applications, May 21, 1990.

Izawa, Tatsuo, Plastic Planar Waveguides for Optical Interconnects, NTT Basic Research Laboratories, pp. 97–100.

(List continued on next page.)

*Primary Examiner*—Phan T. H. Palmer
(74) *Attorney, Agent, or Firm*—Jacobson Holman, PLLC

(57) ABSTRACT

A polymer thin film and method of making the thin film, the thin film having at least one polymeric structure for use as an organic optical component. The thin film includes a first layer of an optically transmissive first polymer having a first refractive index, and having a surface in which is defined at least one retaining feature, an optically transmissive UV curable second polymer retained within the retaining feature, the second polymer having a second refractive index which is greater than the first refractive index, and an overlay of the second polymer having a thickness in the range 0.001 μm to 1.5 μm over the surface of the first layer.

25 Claims, 12 Drawing Sheets

OTHER PUBLICATIONS

Puech, C., Thin Film Optical Components Duplication Method, Optics Communications, vol. 7, No. 2, Feb. 1973, pp. 135–138.

Kurokawa, T. et al., Fiber Optic Sheets Formation by Photopolymerization in Polymer Films, IOOC '77 A8–3, pp. 121–124.

Hagerhorst–Trewhella, J.M. et al., Polymeric Optical Waveguides, SPIE vol. 1177, Integrated Optics and Optoelectronics, pp. 379–386.

Trewhella, J.M. et al., Photopatternable Epoxy Ridge Waveguides, IBM Research Division, Thomas J. Watson Research Center, p. 24.

Hartman, Davis H. et al., Patterned Channel Waveguides on Printed Circuit Boards for Photonic Interconnection Applications, pp. 1–4.

Kurokawa, Takashi et al., Polymer Optical Circuits for Multimode Optical Fiber Systems, Applied Optics, vol. 19, No. 18, Sep. 15, 1980, pp. 3124–3129, 1990.

Matsuura, T. et al., Low Loss, Heat–Resistant Optical Waveguides Using New Fluorinated Polyimides, Electronics Letters, vol. 29, No. 3, Feb. 4, 1993, pp. 269–271.

Imamura, S. et al., Polymer Channel Waveguides with Low Loss at 1–4 $\mu$m, Electronics Letters, vol. 27, No. 15, Jul. 18, 1991, pp. 1342–1343.

* cited by examiner

ORGANIC OPTICAL COMPONENTS AND PREPARATION THEREOF

CROSS-REFERENCE TO RELATED APPLICATIONS

This is a continuing application under 35 USC §120 from U.S. patent application Ser. No. 08/619,717, filed May 23, 1996, which is a §371 application of PCT/GB94/02118 filed Sep. 29, 1994, now U.S. Pat. No. 5,985,084, issued Nov. 16, 1999.

BACKGROUND OF THE INVENTION

1. Field of the Invention

The present invention relates to organic optical components and preparation thereof. Optical components may be used to transmit and/or manipulate light signals in various fields of technology such as telecommunications, data communications, avionic communications, sensor networks, automotive control systems, display and backlighting.

More specifically components are intended for passive light transmission and/or manipulation including polarisation control, transmission, distribution, splitting, combining, multiplexing, phase filtration.

Active optical components requiring electrical connections to power and/or control circuitry are also envisaged.

Specific optical components of the invention include waveguides, strip waveguides, bends, Y-junctions, blazed grating couplers, power splitters, star couplers, holographic gratings, holograms, phase filters, circuitry interconnections, bridging devices, lens arrays and the like.

2. Description of Related Art

A diverse number of organic components are known. U.S. Pat. Nos. 4,593,974 and 4,547,040 (Yamamoto) disclose components comprising embedded organic optical fibres, obtained using extrusion techniques. U.S. Pat. No. 5,455,883 (Shigeta) discloses optical input connections for displays. Organic optical components comprising two or more polymers having different refractive indices are a means of providing more complex light guiding components with excellent optical properties. Increasingly these are favoured over the inorganic counterparts, the preparation of which is increasingly difficult in line with the need for need complex and miniaturised components.

Unfortunately organic optical components suffer high optical losses both by polymer absorption itself and by leakage from imprecise structures and misaligned components. Cross talk between components in high density systems is also a problem.

Organic optical components usually comprise two or more polymers having different refractive indices. The polymer having the higher refractive index when surrounded by the other polymer can function as a waveguide which allows for the transmission and manipulation of a light signal. The higher refractive index polymer is usually introduced into the other resin which is then cured.

Specifically polymer moulding processes have been used involving the filling of mould cavities to produce rigid mouldings with flat faces which can be further processed to provide polymer analogues of optical devices produced using inorganic materials, for example as disclosed in U.S. Pat. No. 5,136,678 (Yoshimura) and U.S. Pat. No. 5,113,471 (Inaishi). Two flat surfaces one provided with channels for filling with resin when the two surfaces are squeezed together is an unreliable method of producing well defined channel waveguides due to the difficulty of avoiding a thick layer of material being formed between waveguides than can allow optical cross-talk between channels. Bonding the two surfaces together before introducing the channel filling resin can be achieved by capillary filling but is time consuming and can be unreliable for complex and large area. Yoshimura and Inaishi disclose a method for preparing optical waveguides by first injection moulding a flat substrate with a number of grooves, next an UV curable resin is filled in the grooves to form a core material. The resin is then irradiated with UV light to cure the core material. Finally a coating is applied to the substrate and core material by a spin, spray, casting, etc method. This procedure an uneven residual layer since a portion of the resin inevitably spills outside the grooves. As the guides described by Yoshimura and Inaishi are very simple, ie no bends or junctions which are overlay critical, it is likely that the importance of an overlay was not appreciated by Yoshimura.

More recent investigators have found that trying to fill injection moulded waveguides by squeezing out the excess (as in Yoshimura) is not a reliable method and have resorted to filling waveguides that have enclosed channels performed using a top cladding by capillary filling or using vacuum assistance, ie using liquid crystal cell filling methods.

Prior art batch processes have been used to define channel waveguides in inorganic or polymer coatings on rigid wafers using lithographic, multistep, materials addition and subtraction processes.

Other production techniques have been developed specifically to avoid spillage of resin or as an alternative dispersing with the need to inject resin, in an attempt to attain acceptable optical losses, uniform output and consistent performance, increasing the incentive to use optical components. However with these there is a practical limit to the size of waveguides which can be manufactured. Since the resin must be poured in grooves in a flat substrate, the groove must be sufficiently large to receive the resin, and the device for pouring the resin must be sufficiently sophisticated to ensure the resin does not overflow the grooves. Therefore prior to the invention, polymeric optical waveguides smaller than 100 micron were not manufactured which did not have a relatively thick layer of polymer of variable thickness which produced unacceptably high losses.

Lithographic techniques, for example, as disclosed in Inamura et al, "Electronics Letters", 27 (15), 1342–1343 (Jul. 18, 1991) and Matsura et al "Electronics Letters", 29 (3), 267–271 (Feb. 4, 1993) conventionally entail fabricating a waveguide comprising of core and buff layers on substrate by waveguide patterns fabricated using photolithography, core ridges then formed by reactive ion etching until the buffer layer surface is exposed and finally the core ridges covered with a spin coated cladding layer, relies on immersing the waveguide pattern entirely subsequent removal of residual material. U.S. Pat. No. 5,265,185 discloses a similar process using a combination of spin coating and then etching. Although the resulting product has no residual overlayer as a result of the reactive ion etching, the technique is time consuming and laborious and not suited to further miniaturisation. Imamura discloses mono and multi mode waveguides comprising film thicknesses of 8 and 15 micron using specific low optical loss polymers and reporting low optical losses.

Capillary techniques, for example as disclosed in U.S. Pat. No. 5,265,184 (Lebby et al) are also known as a means to avoid residual overlay from ation. In these techniques a waveguide mould is obtained and an encasing lid glued on top. Waveguide shaped cavities are then filled by capillary action with resin subsequently curing. Lebby injects resin into the channels. It is important to avoid cavitation, bubble formation, striations and the like. These considerations become more important the more complex the optical component, the finer the channel and the greater the total mould surface area. Accordingly complex or extensive products obtained using this technique are commercially unviable.

A further technique which avoids overlay formation is known as selective photopolymerisation, for example as disclose in EP 0 420 592 (Nippon Telegraph and Telephone Corporation), U.S. Pat. No. 5,265,185 (United States of America, Secretary of the Army) and Booth et al J Heatwave Technol, 7(10), 1452. Monomers contained in a polymer are selectively polymerised to change the refractive index to make a pattern like optical waveguide. Specifically a mask having a predetermined patter is mounted on a polymer sheet or substrate composed of a transparent polymer which contains a low refractive index monomer and the sheets or substrate are irradiated with UV rays through the mask to selectively polymerise the low refractive index monomer, replicating the patterns. The photopolymerised portion of the polymer has a lower refractive index than the polymer matrix. The polymer sheet is heated in vacuum toremove unreacted monomers which remain in areas unexposed by UV rays. As a result unexposed portions of the polymer consists of the high refractive index polymer alone. The patterned sheet may then be sandwiched by cladding layers of low refractive index polymer to produce an optical component. Variations such as selective cross linking and are also disclosed. This technique suffers from variations in refractive index depending on residual monomer content, and protrusions and depressions formed during development of the polymer, further distorting the optical properties. Channel base and side wall roughness also becomes a limiting factor in this technique as does cross talk between channels. Further examples of this technique are disclosed in Kurokawa et al IOOC 1997, A8-3, 121 and AO 19 (18) Sep. 15, 1980, 3124–9, Hartman, Topical Meeting on Integrated and guided wave optics 1988, 62–5, Truhalla, SPIE, 1177, Integrated optics and optoelectronics (1989) 379–386 and OFC 1991, Feb. 19, 1991 and Izawa et al, European Conference on Optical Communications, ECTS 1991, 97–100.

Finally, a third technique which avoids problems associated with the foregoing methods involves moulding and embossing, for example as disclosed in U.S. Pat. No. 5,171, 293 (Iida). A mould is fabricated to include a waveguide relief. The mould is used to emboss the waveguide or grating relied into a thermoplastic polymer structure which is then cured. The structure is then filled with higher index polymer and the structure encased thereby squeezing the polymer filling. The enclosed polymer is then cured. The top cladding may be retained or replaced in the final optical component formation. Examples of this technique are disclosed in Dannberg et al and Neyer et al, European Conference of Optical Communication, Montreux 1993, Proc 437–440 and 337–340,, Pahlke et al, Tech Messen 60 (93), 339, Baraldi et al, Proceedings of the 18$^{th}$ Conference on Optical Communications (ECOC) 1992, 56–64 and Rogner et al, SPIE Vol 1506 Micro-Optics II (1991), 81–91. In this case it is difficult to avoid formation of an overlay moreover the overlay thickness is highly prone to variation since the top cladding surface is unlikely to be planar, nor is the open top of the embossed thermoplastics substrate and this will lead to unevenness. The difficulties are moreover likely to be greater the greater the size of the structure. The overlay thickness is also likely to be significant since it is difficult to expel excess material simply by pressing a plate onto the embossed thermoplastic substrate.

Accordingly there is a need for organic optical components which do not suffer from the inherent fabrication distortions described above, specifically do not comprise a thick and uneven residual layer between channels or if having no layer at all between channels do not suffer from poor optical qualities within the channels.

Moreover there is a need for a greater precision in dimensioning of organic optical components with a view to the wavelength of light to be transmitted. Specifically a component having particular dimensions may operate in multimode for a given wavelength of light, such as visible light, whilst performing as mono mode for a different wavelength such as ir. By tailoring the component dimensions specifically to an envisaged wavelength of radiation the optical losses may be dramatically reduced. This necessitate however a very high accuracy in both the wavelength cladding and core.

Moreover there is a need for highly complex and high density optical components comprising mono and multi layer structures with precide interconnection of components to avoid spillage for example by mismatching a waveguide to an optical fibre and the like. Processed which provide an optical system in a single production cycle allow precise matching an control of components thereby dramatically reducing optical losses. Accordingly there is a need for an integrated optical system comprising integrated components.

SUMMARY OF THE INVENTION

We have now surprisingly found an organic optical component and preparation method therefore which provide controlled introduction of resin as a waveguide in manner to control overlay formation, and which overcomes the above disadvantages. The component provides a number of additional advantages in terms of performance, processing and preparation of complex systems.

In its broadest aspect there is provided according to the present invention a polymer thin film comprising at least one polymeric relief structure for use as an organic optical component, comprising a) a first layer of a first polymer;

b) an optically transmissive UV curable second polymer having at least one relief feature, the second polymer having a refractive index which is suitable for transmission or manipulation of light; characterised by c) an overlay of the second polymer about the at least one relief feature having a thickness in the range 0.001 micron to 1.5 micron over the surface of the first layer.

The second polymer layer may be supported on the first layer and protrude therefrom or may be contained as a core within the first layer as a cladding layer. In this case the second case projects inwardly into the first layer, and in the case that the second layer comprises a plurality of relief features, there are a plurality of projections whereby the two layers are effectively co-continuous.

In a first aspect there is provided according to the present invention a polymer thin film comprising at least one organic optical component for use as an organic optical component which polymer film comprises (a) a first layer of an optically transmissive first polymer having a first refractive index, the first layer having a surface in which is defined at least one retaining feature adapted to retain a polymer therein;

(b) a retention layer of an optically transmissive UV curable second polymer retained within the at least one retaining feature, the second polymer having a second refractive index which is greater than the first refractive index; characterised by (c) an overlay of the second polymer over the first layer adjacent the at least one retaining feature, the overlay having thickness in the range 0.001 μm to 1.5 μm over the surface of the first layer.

1. Preferably the polymer thin film comprises additionally (d) a second layer of an optically transmissive third polymer having a first refractive index which is less than the second refractive index and which second layer contacts the second polymer retained within the at least one retaining feature and the surface of the first layer wherein the organic optical component exhibits an optical loss of less than 2.0 dB cm$^{-1}$ at at least one wavelength in the range 300 to 1600 nm.

The components of the invention provide the following advantages:

1 Photocurable polymer formulations that provide the range of optical properties required particularly refractive index and effective transmission at the desired operation wavelength(s).
2 Precision moulded channels or retaining features for forming optical waveguides and support structures for other components that require precise alignment with the waveguides.
3 Light guiding cores with insufficient overlayer of material preventing optical leakage to adjacent waveguides enabling low noise optical signals processing within high densities of guides using optical circuitry functions such as splitting, combining, multiplexing, demultiplexing.
4 Flexible waveguides covering large areas sufficient for use with, for example, displays and in continuous lengths such that the product forms a conveyor belt for ease of component integration and mass manufacture. Simple cutting, slitting, encapsulation processes can be used for final product conversion.
5 Functional layers can be added to the back or front of the product by additional lamination, film substitution, coating and/or embossing.
6 Pick and place technology can be used to insert components on the conveyor belt assembly line.

The thin film of the invention may be provided as a composite with additional layers of polymer or other support materials as hereinbefore defined or may be unsupported.

The thin film has any length and width dimensions that facilitate winding on to a reel.

The film may comprise any one or more optical structures such as waveguides and the like which may be useful as an integrated system or which may be cut into portions as individual optical components.

The overlay of the second polymer has a maximum thickness of 1.5 micron. The thickness of the layer may be selected in the range 0.001 to 1.5 micron, whereby a lower value is selected when it is desired to transmit light of shorter wave lengths and any value in the range may be selected when it is desired to transmit longer wavelength light. It will be appreciated that the overlayer thickness should not exceed the selected value however it may be less than that value or may even be 0 thickness in regions. Accordingly the layer thickness may vary between any desired value in the hereinbefore defined range and 0. In some instances it may be preferable to attain a high level of uniformity in which case a suitable variation may be in the range +/−0.75 micron (provided that that value does not exceed a total of 1.5 micron or is not less than 0), more preferably +/−0.25 micron (within the same constraints), most preferably +/−0.1 micron (subject to the same constraints).

Preferably the film is in a form of an elongate film of length in excess of 2 m, or a portion thereof.

The polymeric film may be useful for providing optical components for mono or multi mode operation, by selection of overlay thickness and wave length of light to be transmitted.

The polymeric film preferably comprises optical structures comprising integral positioning aids for positioning in optical communication with further optical components. These may be provided at any one or more of the edges of the film or structure or may be provided at the edge of each component provided on the film. It is a particular advantage that the positioning aid is integral with the component. This avoids undue losses which may be caused by imprecise positioning.

Preferably a portion of a polymeric film as hereinbefore defined comprises at least one laser cut edge. This provides precise dimensioning of the component which is thereby portioned off and moreover provides a totally smooth incision which is suite for precise connection within an optical system avoiding undue losses.

The polymer film may comprise any additional supporting or other functional layers onto which it is suitably laminated by self adhesion or with use of additional adhesive, preferably an optical adhesive.

The thin polymer film may comprise optical components having any desire dimensions. A plurality of optical components on a single film may be the same or different both in terms of configuration and dimension. The film is particularly suited for providing components having at least one dimension selected from height and/or width and/or diameter in the range 1:250 micron, preferably 5:50 micron or 1:10 micron, more preferably 5:10 micron or 1:5 micron The supporting substrate material and thickness is preferably chosen so that the laminate remains flexible. This has the advantage that the method of preparation can be run as a continuous reel to reel process. The product from this process comprises a reel of the film laminate. That laminate may be subsequently slit or cut to separate out individual smaller components or the product may largely comprise the uncut film laminate thereof.

The first layer may be supported by a suitable substrate which may be subsequently removed from the first layer. Alternatively, the substrate may remain with or is subsequently applied to the first layer thereby providing a laminate structure in which the relatively expensive first layer is of a thickness which is sufficient to provide the desired depth of retaining feature and complementary optical contrast and the substrate provides the desired level of support and may also provide additional positioning features for such items as optical fibres and other optical components. Thus in a preferred embodiment, the first layer is supported by a thicker support layer which possesses positioning grooves which are in alignment with the at least one retaining feature and which grooves are able to receive and locate optical fibres in abutment to the end of each at least one retaining feature. It is particularly preferred that the optical fibres are so located during the application of the second polymer and that sufficient of the second polymer is applied such that a suitable optically correct joint is formed between the end of the retaining feature and the abutting end of the optical fibre.

The second layer may be provided by coating the third polymer onto the first layer or precoating the optionally releasable dispensing layer,. Conveniently, the dispensing layer provides the second layer such that the second layer is superimposed upon the surface as a consequence of the advancement of the line of contact. The second layer may also be provided with retaining features in which is retained an optically transmissive polymer, which may be the same as the second polymer and which may be so placed that at least some of the retaining features of the first layer are matched with at least some of the retaining features of the second layer such that they can form a composite optical component.

The optically transmissive polymers may be selected from those known in the art including those developed as light curable adhesives for joining optical components for example those sold under the LUXTRAK (LUXTRAK is a trade name of ICI plc), those developed for polymer optical fibre fabrication and those developed for optical recording using polymer photoresists.

In particular the optically transmissive second polymer may be formed from a suitable resin for example halogenated and deuterated siloxanes, acrylates and methacrylates such as ethyleneglycol dimethacrylate, tetrafluoropropylmethacrylate, pentafluorophenylmethacrylate, tetrachloroethylacrylate, multifunctional derivatives of triazine and phosphazene. Resins and polymers that contain highly fluorinated aliphatic and aromatic moieties, particularly those capable of being formed into cross-linked or covalent networks, are preferred. Additionally the second polymer may comprise a resin or polymer formulation that provides a non-linear optical (NLO) property such as described in European patent application EP-0474402-A, second order NLO properties, third order NLO properties or signal amplification properties.

The optically transmissive first polymer in which the retaining feature is formed may be prepared from curable resins or can be fabricated from substituted and unsubstituted polymers selected from polymethylmethacrylate, polycarbonate, polystyrene and polyimides.

Suitably for the preparation of monomodal organic optical components, in particular those in which the retaining features have a height and a width from 5 to 10 $\mu$m, the difference between the second refractive index and the first refractive index is from 0.001 and 0.02, preferably from 0.002 and 0.01 and particularly from 0.004 and 0.007, i.e. the difference is from 0.05 to 1.5% of the first refractive index. Where the retaining features have a height and a width from 1 to 5 $\mu$m and in which instance the reduction in the thickness of the overlay is even more advantageous, it is preferred that the difference in refractive index is from 1 to 30%, particularly 1 to 20%, and especially 1 to 5% of the first refractive index.

Preferably, the second polymer has a refractive index from 1.4 and 1.7, for example from 1.43 and 1.57.,.

Where the second polymer is coupled to the end of an optical fibre it is preferred that the second polymer has a refractive index which closely matches that of the optical fibre. In such circumstances it is also preferred to select a second polymer which shows good intrinsic adhesion to the optical fibre which is principally formed from silica.

The refractive index of the polymers may be modified by the inclusion of suitable additives to the polymer, in particular mixtures of those polymers mentioned above may be used to achieve a desired refractive index. Where the major component of the second polymer is bis(oxy ethyl methacrylate) 2,2', 3,3', 4,4' hexafluoroglutarate, it is particularly preferred that the refractive index of the second polymer is adjusted by adding appropriate amounts of ethylene glycol dimethacrylate which can increase the refractive index (as measured at 1.32 or 1.55 $\mu$m) by an absolute value in excess of 0.02 when added at a level of 30% by weight.

The overlay of the second polymer has a maximum thickness of less than 1.5 $\mu$m, preferably less than 1 $\mu$m, and particularly less than 0.5 $\mu$m over the surface of the first layer. The average thickness of the overlay is preferably less than 1 $\mu$m and particularly less than 0.5 $\mu$m. The variation of the thickness of the overlay across the surface is preferably less than ±0.75 $\mu$m, particularly less than ±0.5 $\mu$m and especially less than ±0.25 $\mu$m. When formed into an organic optical component the component will exhibit an optical loss of less than 2.0 dB.cm$^{-1}$, preferably less than 1.0 dB.cm$^{-1}$ and particularly less than 0.5 dB.cm$^{-1}$.

The at least one retaining feature is conveniently in the form of a channel, and typically is of a generally trapezoidal cross-section although other configurations are possible, for example rectangular, square or semi-circular. As stated above, for a monomodal organic optical device, the height and width of a retaining feature may be in the range 1 to 10 $\mu$m depending on the difference in refractive index used. However, preferably the height and width of the retaining features are in the range of 5 to 10 $\mu$m, and particularly in the range 6 to 8 $\mu$m. Preferably the maximum width of the retaining feature is at the surface of the first layer. Typically, the ratio of the maximum width to minimum width is less than 2:1 and is preferably about 1:1. The retaining feature may be formed by any suitable technique for example a lithographic etching process such as reactive ion etching through a suitable mask although moulding or embossing is preferred. Where the organic optical device is to be used as a multimode device then similar fabrication techniques can be used with suitable adaption of the dimensions and selection of materials, usually though the height and width of the retaining features when employed in a multimodal device are in the range 10 to 100 $\mu$m, for example 10 to 50 $\mu$m.

In order to facilitate the curing of the resin it is preferred to use an initiator, for example a thermal and/or photoinitiator and particularly an initiator which does not absorb light at the operating wave length of the organic optical component. Typically, when used, an initiator is present in the resin at a concentration from 0.1 to 3.0% by weight, and preferably from 0.5 to 2.0% by weight. Suitable photoinitiators include 2-methyl-1-[4-(methylthio)phenyl)-2-morpholino propanone-1 (Irgacure 907), 1-hydroxycyclohexyl-phenyl ketone (Irgacure 184), isopropylthioxanthone (Quantacure ITX), Camphorquinone/dimethylaminoethylmethacrylate.

The method of manufacturing a waveguide film laminate where the waveguides are continuous along the length of the film would be as follows;

(a) an embossing roller is provided with a raised surface relief of the dimensions required to form the at least one retaining feature. The surface relief runs around the circumference of the roller in a continuous manner.

(b) A polymeric structure for use in the preparation of the continuous waveguide laminate is made by coating one side of the flexible substrate with a first polymer layer and contacting this layer with the embossing roller so as to transfer the retaining structure of the waveguide into the first polymer layer. The first polymer layer is cured while in contact with the embossing roller and then the film released.

(c) A line of contact is formed between a flexible dispensing layer and the surface of the first polymer layer and the surface is progressively contacted with the flexible dispensing layer such that the line of contact advances across the surface.

(d) Sufficient resin is applied, capable of being cured to form the second polymer and to substantially fill the waveguide features, along the line of contact.

(e) sufficient pressure is applied along the line of contact such that (1) substantially all of the resin which is surplus to that required to fill the waveguide features at the line of contact progresses with the advancing line of contact thereby filling the waveguide features with resin; and (2) no more than a quantity of resin capable of forming the overlay of the second polymer passes the line of contact; and (3) the resin filling is cured in the waveguide features."

The supporting substrate material may be subsequently removed from the first layer.

Alternatively, the substrate may remain with the first layer providing a flexible laminate structure in which the relatively expensive first layer is of a thickness which is sufficient.

As the line of contact moves across the surface of the first layer the resin is effectively pushed across the surface and flows into the at least one retaining feature. The rate at which the line of contact advances across the surface will depend, amongst other things, on the characteristics of the resin. Typically, the resin has a viscosity from 0.1 to 100 poise and more typically from 10 to 100 poise. Preferably the line of contact is moved along the length of the retaining feature, particularly when the retaining feature had a width or height greater than 10 μm, thereby improving the filling of the retaining feature and reducing the possibility of inclusion of gas bubbles.

The resin may be fully retained with a retaining feature as the line of contact moves from the retaining feature, in which case the resin may be cured at any convenient subsequent time. However, the resin may often show some degree of resilience in the non-cured form in which case as the line of contact moves from the retaining feature the resin therein will tend to relax and stand proud of the retaining feature thereby reducing the effectiveness of any optical component subsequently formed from the polymeric structure. To counter the relaxation of the resin it is preferred that the resin is cured whilst the line of contact passes over it. Conveniently and preferably therefore, the resin contains a photoinitiator which is activated by a particular wavelength of light, particularly UV light. A suitable source of light may then be used to cure the resin before the pressure applied along the line of contact is released and before the resin relaxes from the retaining feature. It is especially preferred that the dispensing layer is transparent to the light used and that the light is alone through the dispensing layer towards the resin. In order to focus the light substantially at the tip and thereby avoiding, for example, premature curing of the resin, the angle of incidence of the light onto the line of contact may be required to be adjusted from polymer to polymer. Alternatively, for a given angle of incidence and where the first layer is at least partially transmissive to the light, the first layer may be chosen to have a thickness such that the internal refraction of the incident light acts to focus the light at the line of contact. Additionally, where the first layer is at least partially transmissive to the light and is of a suitable thickness, a mirrored support may be positioned under the first layer thereby causing the transmitted light to be reflected back to the line of contact.

The pressure is applied along the line of contact by any suitable means. Suitably, the pressure is applied using a roller under a compressive load which may thus on rotation retain the resin in the nip formed by the roller between the buffer layer and the surface. It is therefore preferred that the resin is cured at the nip as the line of contact progresses across the surface.

BRIEF DESCRIPTION OF THE DRAWINGS

The process of the invention may be employed using any combination of advancing line of contact including embossing rollers. The process preferably employs reel to reel techniques as known in the art and may include any combination of means for applying or dispensing resin for embossing, such as wiping, dipping, dispensing and the like. A flexible dispensing layer may be removed subsequent to processing. In a reel to reel process using an embossing roller a flexible dispensing layer may optionally be substituted by the surface of the embossing roller.

The present invention is illustrated by reference to the following figures.

DETAILED DESCRIPTION OF THE PREFERRED EMBODIMENTS OF THE INVENTION

Figure 1:
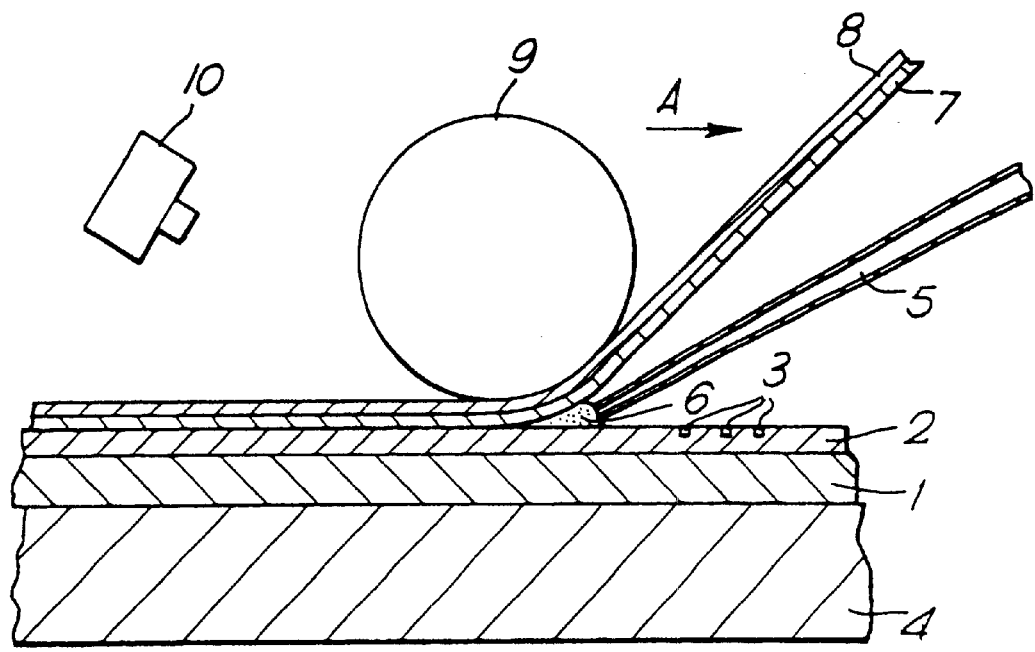
FIG. 1 shows a schematic diagram of an organic optical component being formed according to the process of the present invention.

In FIG. 1, a first layer (2) is supported on a substrate layer (1) which is held in position by a vacuum bed (4). The first layer (2) has retaining features (3) in the form of channels. A resin dispenser (5) provides a supply of resin (6) containing a photoinitiator to the line of contact formed between the first layer (2) and a second (7) supported on a substrate layer (8). The roller (9) applies a pressure along the line of contact and moves in the direction indicated by the arrow (A). The resin is thus squeezed across the surface of the first layer (2) by the action of the roller and into the retaining features (3) thereby only leaving a very small residual overlay of the resin between the second layer (7) which is superimposed over the first layer (2). As the resin filled retaining features pass through the nip of the roller, UV light from the source (10) irradiates the resin and initiates the curing of the resin.

Figure 2:
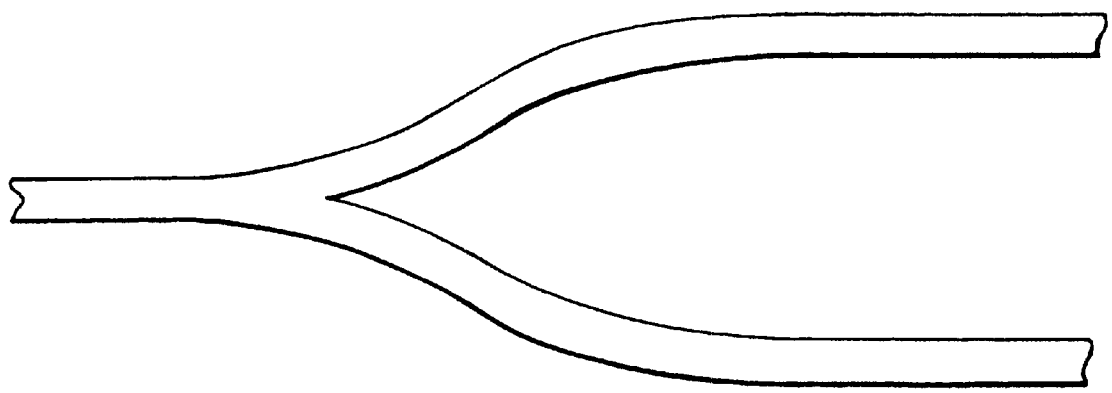
FIG. 2 shows an optical device capable of being formed by the process of the present invention.

FIG. 2 is an optical device which has a wave guide a so-called "Y" junction or splitter in which light is directed along the stem of the Y and is split between the two branches.

Figure 3:
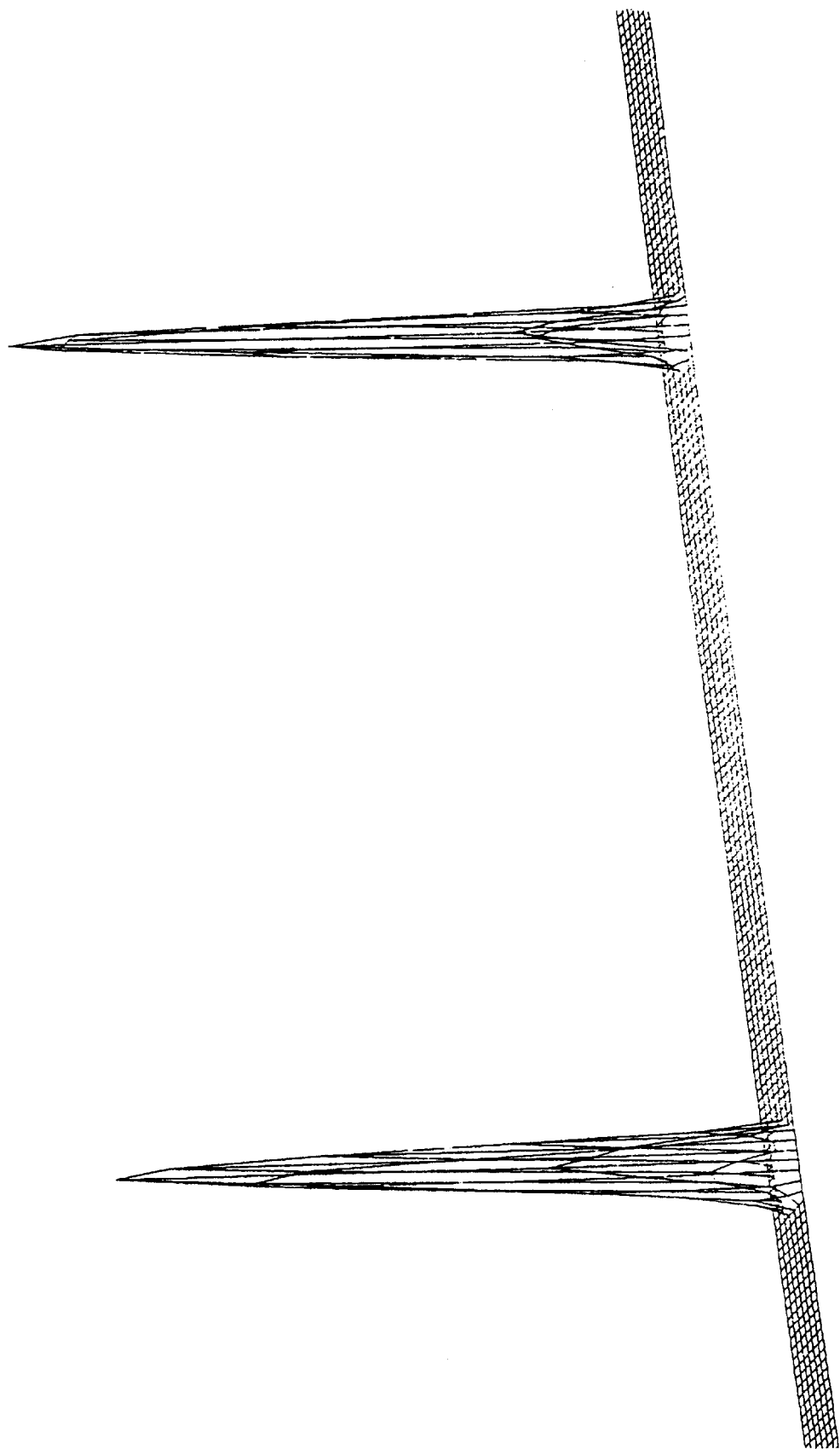
FIG. 3 shows an analysis of the output of the optical device formed in Example 1.

FIG. 3 shows a graphical representation of the intensity of the light signal as emitted from the branched end of the optical device as prepared in Example 1. The major 5 peak represent the light emitted from the actual branches of the "Y" junction. The absence of other peaks show that the optical device is able to retain substantially all the light signal within the wave guide, i.e. there is little or no overlay present.

Figure 4:
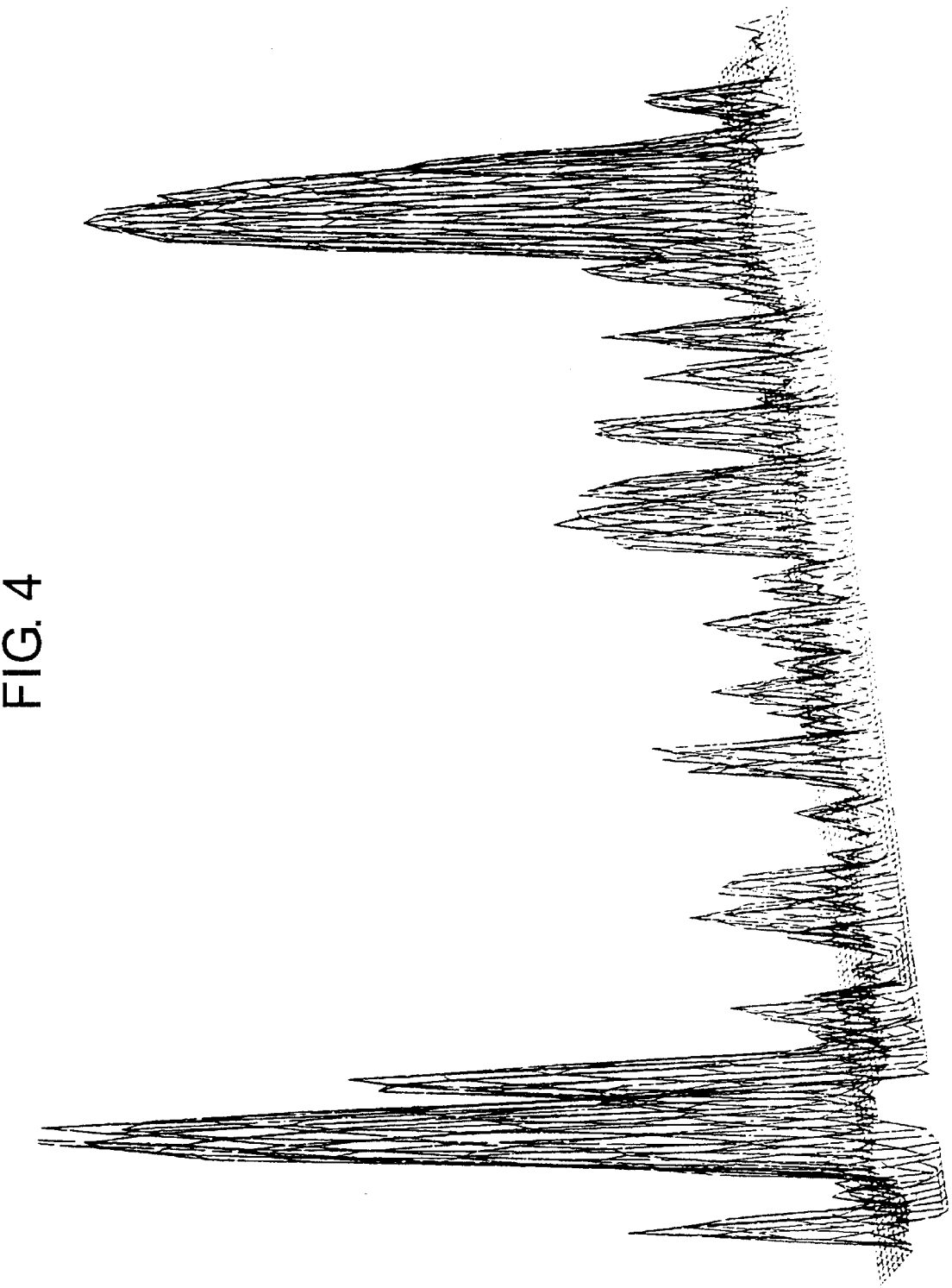
FIG. 4 shows an analysis of the output of the optical device formed in Example 2.

FIG. 4 is similar graphical representation as that of FIG. 3 except that the "Y" junction was that prepared in Example 2. As before, the major peaks represent the light emitted from the actual branches of the "Y" junction. However, the presence of substantial overlay allows leakage of the light signal for the wave guide which can be seen by the large number of minor peaks to either side of each major peaks.

Figure 5:
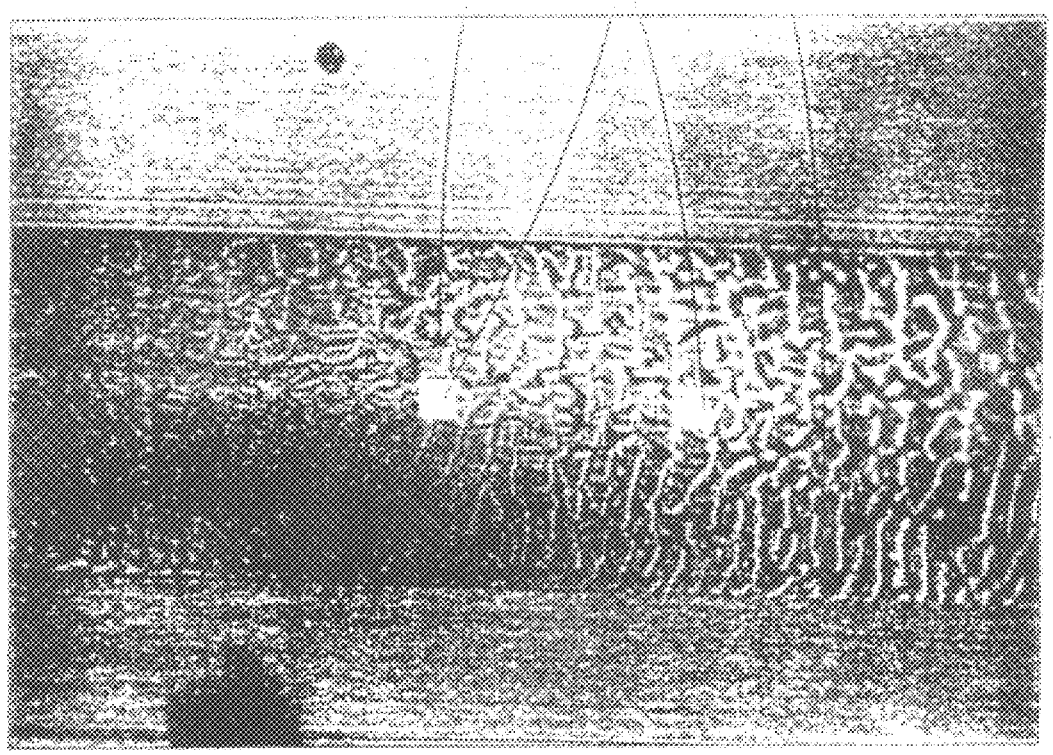
FIG. 5 is a cross-section of the branched end of the device formed in Example 1.

FIG. 5 shows a cross-section of the optical device as prepared in Example 1 comprising a first layer (1a) having embossed, and filled, retaining features (2) and a second layer (1b). As is evident there is little or no discernible overlay present.

Figure 6:
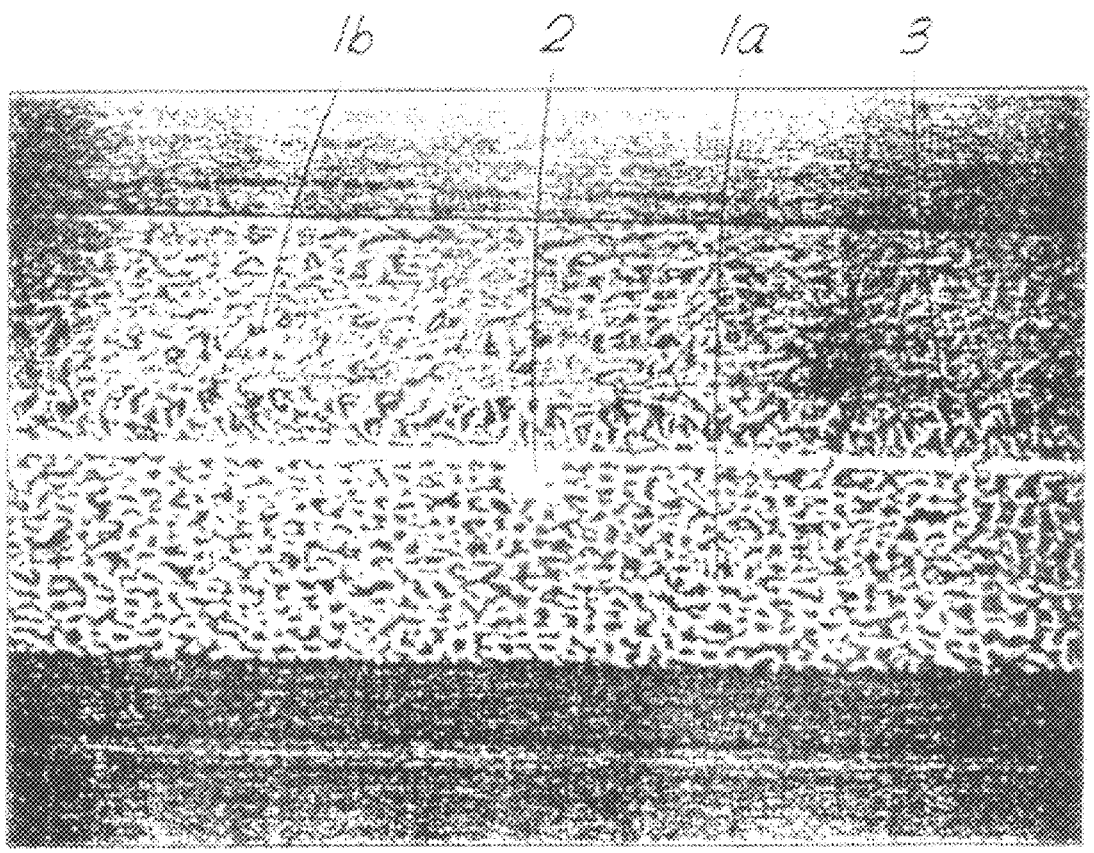
FIG. 6 is a cross-section of the stem end of the device formed in Example 2.

FIG. 6 shows a cross-section of the optical device as prepared in Example 2 comprising a first layer (1a) having embossed, and filled retaining features (2) and a second layer (1b). Between the first layer (1a) and second layer (1b) there is an interposing, overlay (3).

Figure 7:
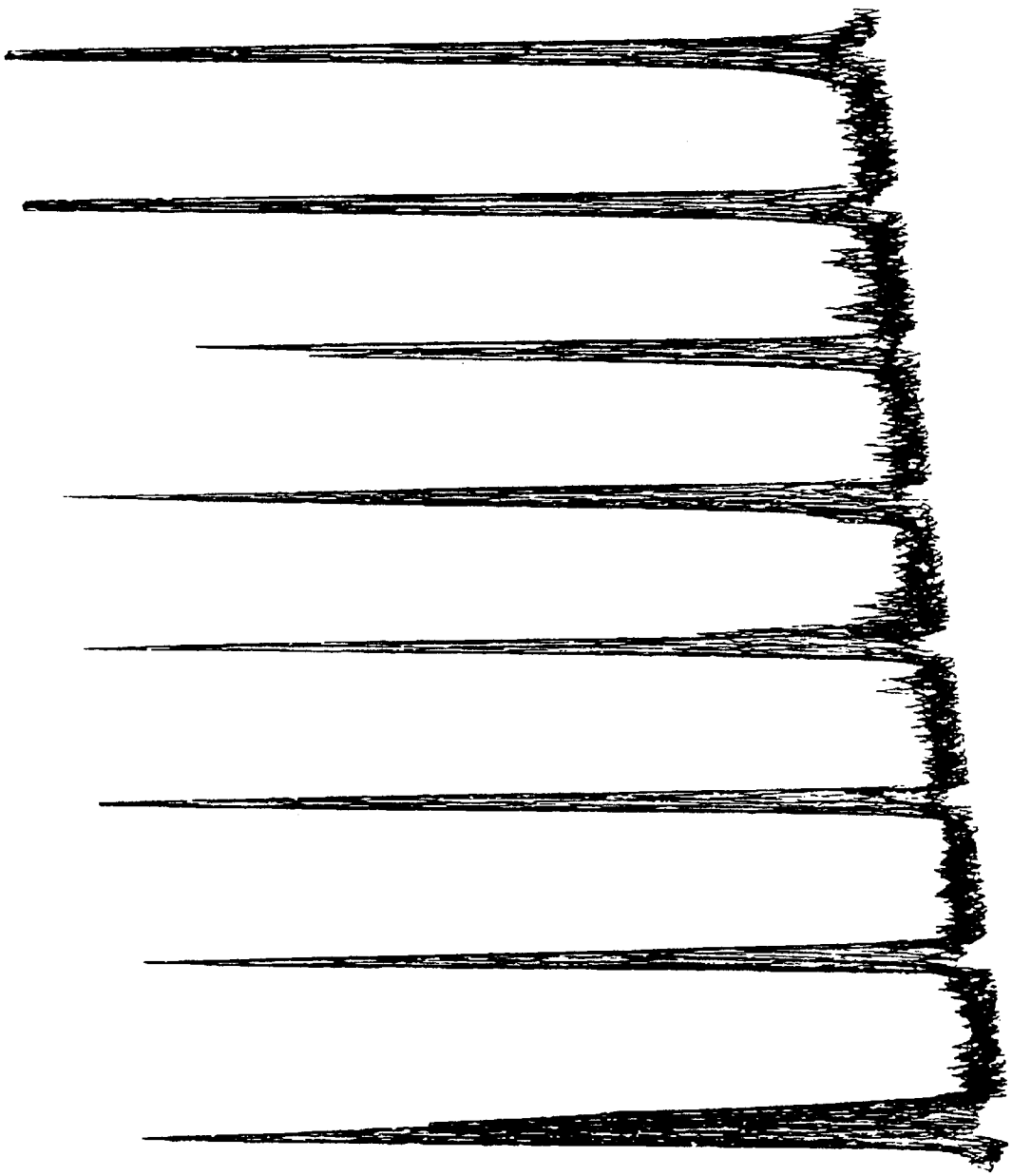
FIG. 7 shows an analysis of the output of the optical device formed in Example 7.
Figure 8:
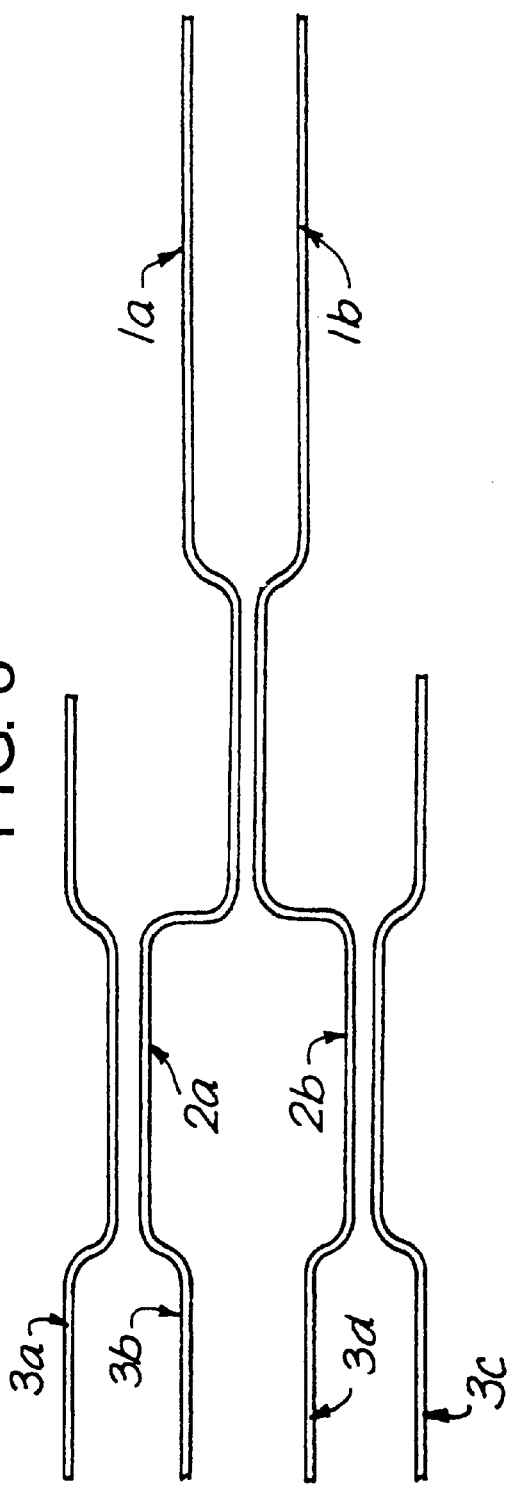
FIG. 8 shows an additional optical device capable of being formed by the process of the present invention.

FIG. 7 shows a graphical representation of the intensity of the light signal as emitted from the branched end of the optical device as prepared in Example 7. The major peaks represent the light emitted from the actual branches of the 1×8 passive splitter. The absence of other peaks shows that the optical device is able to retain substantially all the light signals within the wave guide FIG. 8 is an optical component known as a 2×4 splitter. An incoming light signal from one or other of stems (1a, 1b) is progressively split into two signals along branches (2a, 2b) and thereafter four signals along branches (3a, 3b, 3c, 3d).

Figure 9:
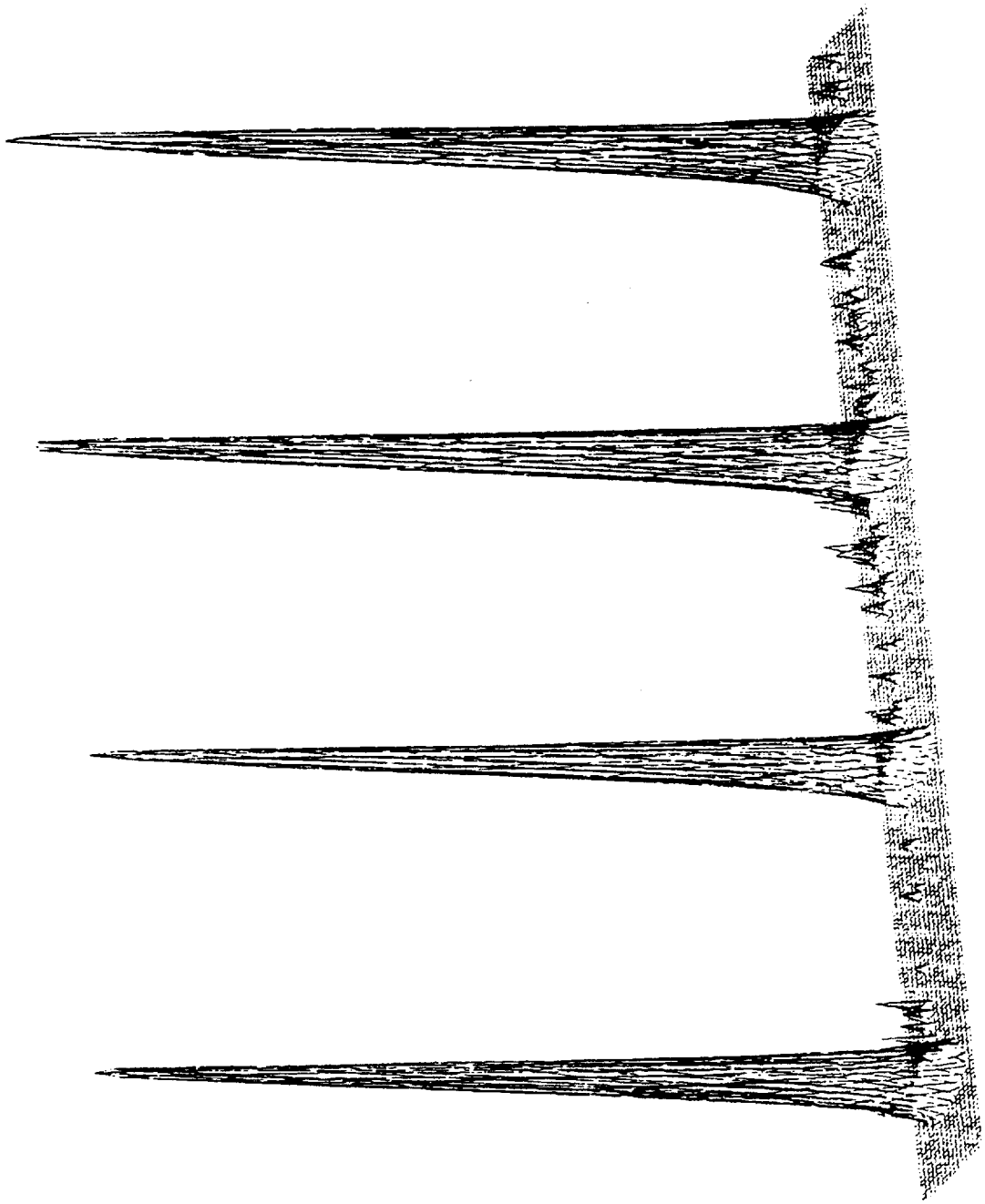
FIG. 9 shows an analysis of the output of the optical device as shown in FIG. 8.

FIG. 9 shows a graphical representation of the intensity of the light signal as emitted from the ends of branches (3a, 3b, 3c, 3d) of the 2×4 splitter as shown in FIG. 8 and fabricated according to the process of the present invention. The major peaks represent the light emitted from the ends of the branches. The absence of other peaks show that the optical device is able to retain substantially all of the light signal within the wave guide, i.e. there is little or no overlay present. The signal from each of the branches was within 0.1 dB of each other.

Figure 10:
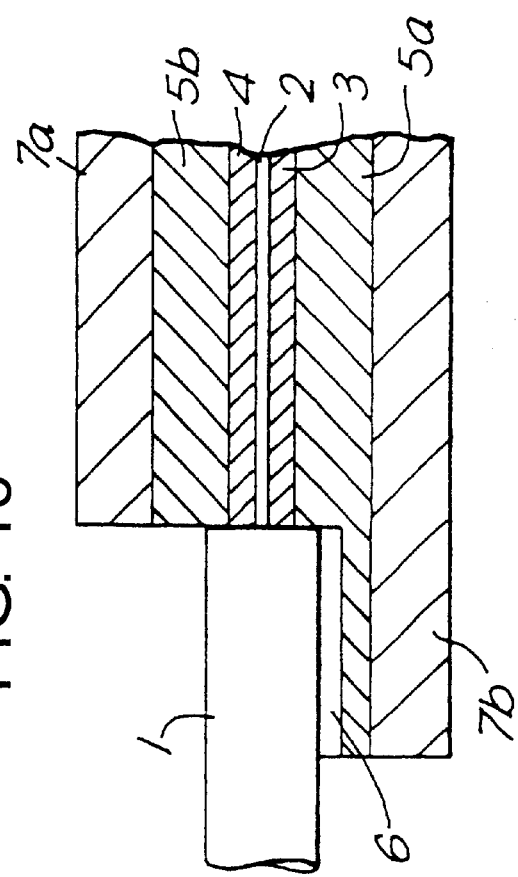
FIG. 10 shows the positioning of an optical fibre within an optical device capable of being formed by the process of the present invention

FIG. 10 shows how an optical fibre (1) may be abutted against a retaining feature (2) which has been filled with the second polymer. The retaining feature (2) is located within a first layer (3) over which has been applied further first polymer to form a second layer (4). The first layer (3) is supported by a substrate (5a) in which is formed a positioning feature (6), e.g. a "V" groove in which the optical fibre (1) is located. Further supporting layers (5b, 7a, 7b) are also provided.

Figure 11:
FIGS. 11 to 15 show configurations of optical components

FIG. 11 shows the microtomed end face of the multimode waveguide device in example A. The waveguide width=10 $\mu$m, depth=10 $\mu$m and waveguide pitch=20 $\mu$m. The overlayer thickness is <0.5 $\mu$m.

Figure 12:
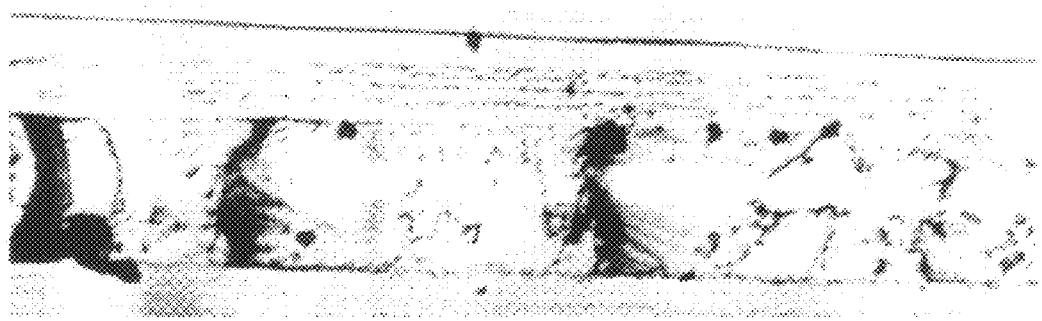

FIG. 12 shows the microtomed end face of multimode waveguide device in example B. The waveguide width=75 $\mu$m, depth=10 $\mu$m and pitch=85 $\mu$m. The overlayer thickness is <0.5 $\mu$m.

Figure 13:
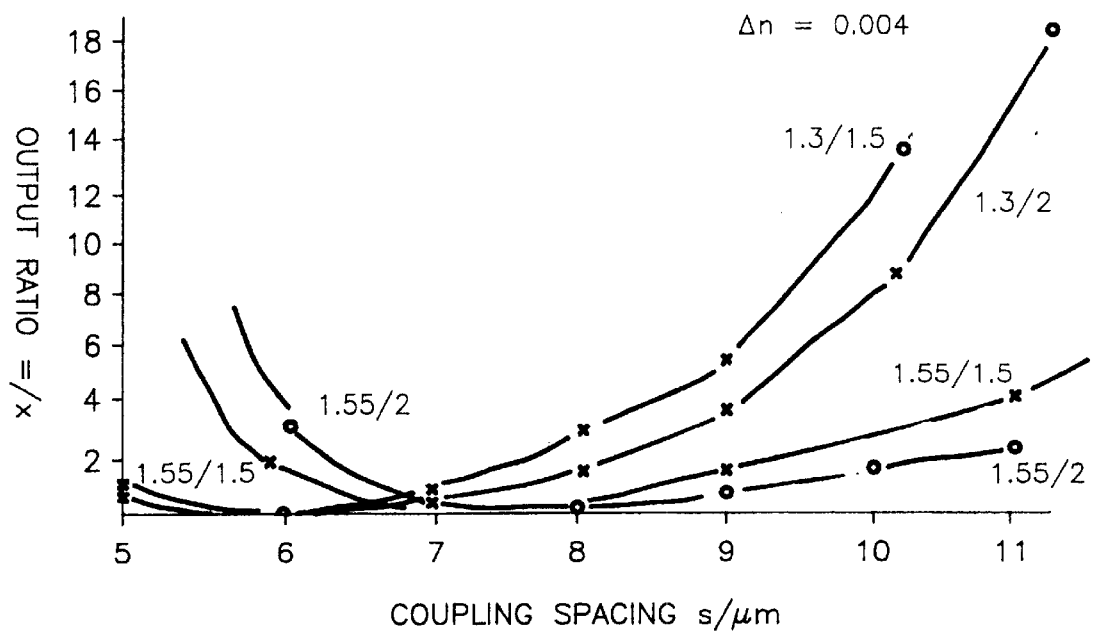

FIG. 13 shows the splitting ratio =/× (through to cross state ratio) for a directional coupler waveguide device calculated for an index difference of 0.004. The calculation was performed at two wavelengths; 1.3 and 1.55 $\mu$m. The figure shows the need to minimise overlayer thickness.

Figure 14:
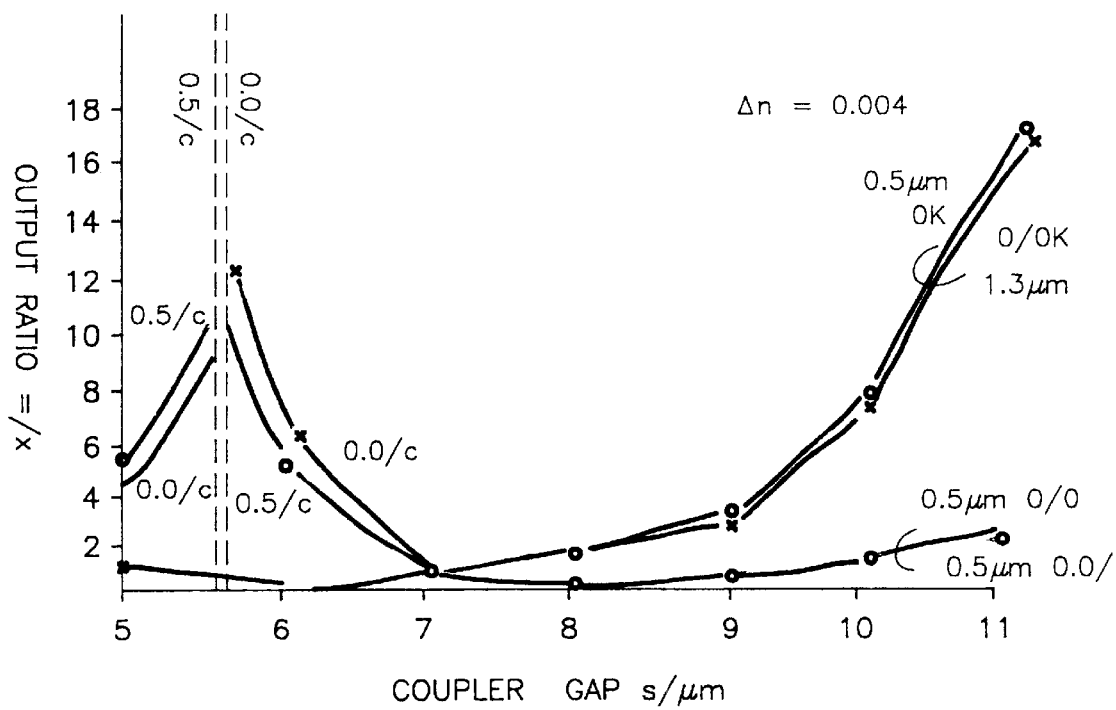

FIG. 14 shows how the splitting ratio =/× (through to cross state ratio) varies for overlayer thickness 0 and 0.5 $\mu$m.

Figure 15:
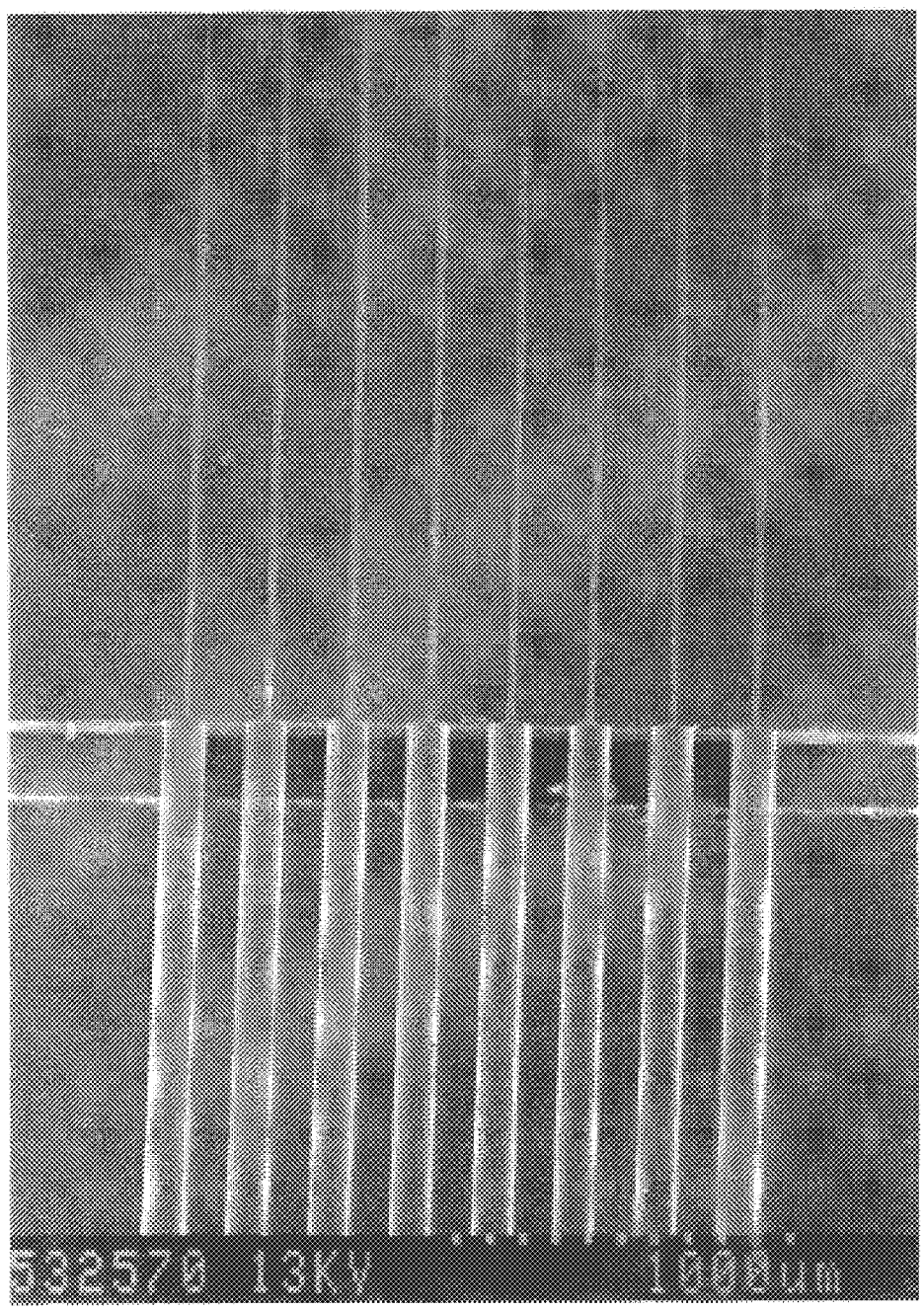

FIG. 15 shows an overhead view of an 8-fibre ribbon aligned supported by positioning features and glued to the output of a 1×8 power splitter device.

Figure 16:
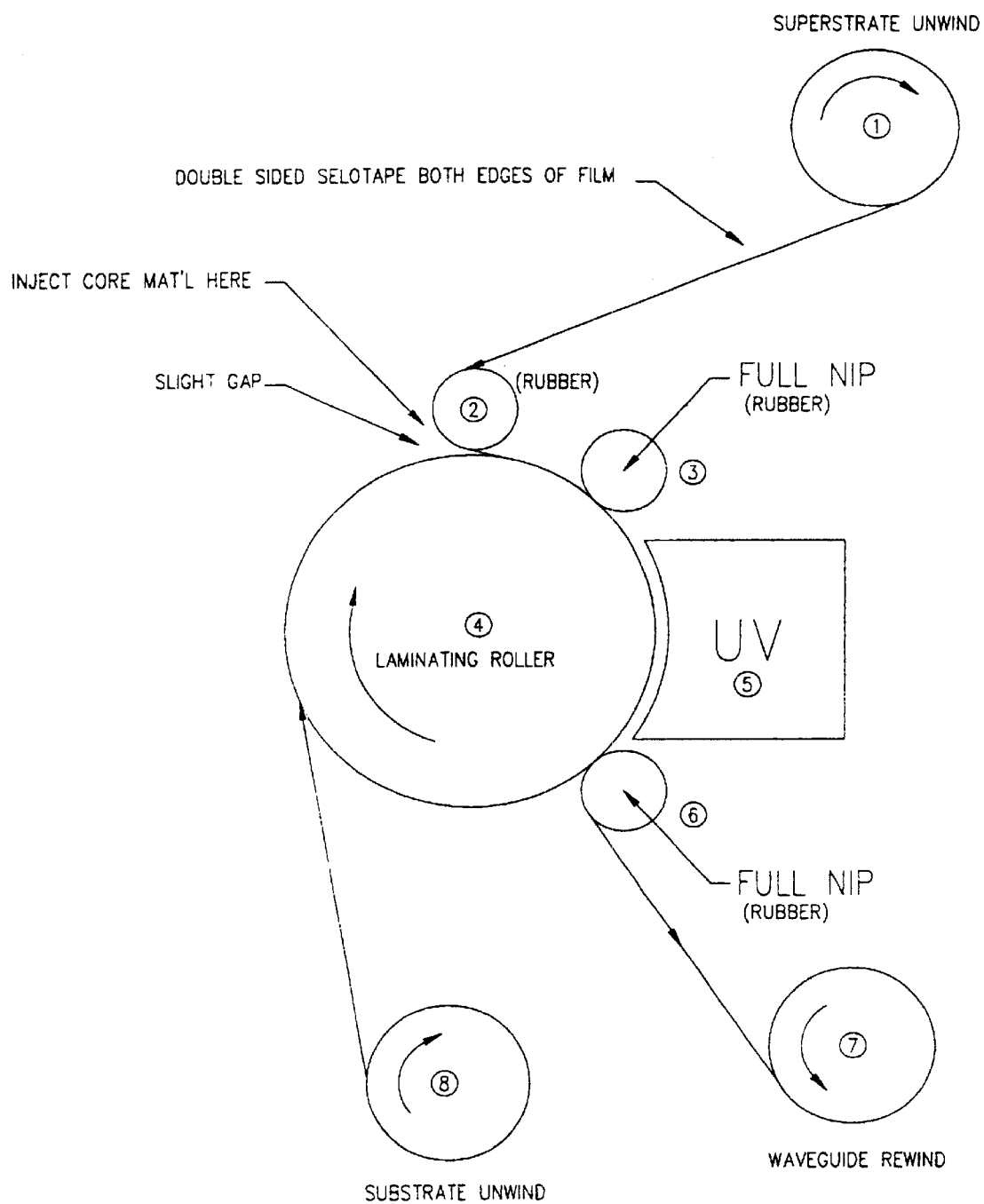
FIG. 16 shows a continuous manufacture arrangement.

FIG. 16 shows the arrangement used for continuous manufacture of a polymer waveguide film laminate.

The invention is also illustrated by the following examples.

Formulation A

This formulation was used to prepare the first polymer in which the at least one retaining feature was formed. The formulation contained 100 parts by wt. of bis(oxy ethyl methacrylate) 2,2', 3,3',4,4' hexafluoroglutarate (HFG)

2 parts by wt. of "Irgacure 651" (Ciba-Geigy)

1 part by wt. tert-butylperoxy-2-ethyl hexanoate ("Interox TBPEH", Interox Chemicals Ltd).

The viscosity of the formulation was measured to be 0.4 Poise using a Carrimed rheometer.

When spin coated to a thickness of 10 $\mu$m onto a high refractive index substrate a fully cured optical coating of Formulation A had a refractive index of 1.449 obtained using the critical angle method.

Formulation B

This formulation was used as the resin from which the retained second polymer was formed. The formulation contained 75 parts by wt. of HFG 25 parts by wt. of 1,3,5 tris(oxy ethyl methacrylate) triazine 2 parts by wt. of "Irgacure 651"

1 part by wt. of "Interox TBPEH".

The formulation viscosity was 0.8 Poise.

Using the method described for Formulation A, Formulation B provided an optical

Coating with a refractive index of 1.466.

Formulation C

This formulation was used as an alternative to Formulation B. The formulation 30 contained 92.5 parts by wt. of HFG 7.5 parts by wt. of ethylene glycol dimethacrylate 2 part by wt. of "Irgacure 651"

1 part by wt. of "Interox TBPEH"

The formulation viscosity was the same as that of Formulation A. The refractive index was 1.4623 at 1.32 $\mu$m and 1.4605 at 1.55 $\mu$m.

Formulation D

This formulation was based on Formulation B except that 5 parts by wt. of a viscosity modifying polymer of the general formula.

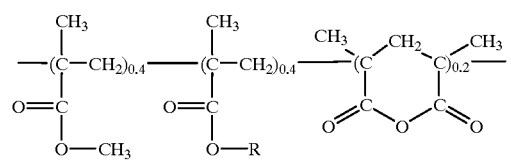

Where R is ethyl acrylate was added

The formulation viscosity was 1.3 Poise.

Formulation E

This formulation contained 100 parts by wt. of an aliphatic polyester acrylate ("Photomer 5018", Harcros Chemicals)

2 parts by wt. of "Irgacure 651"

1 part by wt. of "Interox TBPEH".

The formulation had a viscosity at 25° C. of between 7 to 12 Poise and a refractive index (when cured) of 1.488 at 633 nm (Formulation A which had a refractive index of 1.4638 at 633 nm).

Formulation F

This formulation contained 75 parts by wt. of HFG 25 parts by wt. of ethylene glycol dimethacrylate 2 parts by wt. of "Irgacure 651"

1 part by wt. of "Interox TBPEH".

The viscosity of this formulation was similar to that of Formulation A and had a refractive index (when cured) of 1.4734 at 633 nm.

Formulation G

This formulation contained

Ebecryl 600 (bisphenol A epoxy diacrylate, UCB Chemicals), 80 parts by wt.

Hexane diol diacrylate, 20 parts by wt

Irgacure 184 1.5 parts by wt

Irgacure 651 1.5 parts by wt

Daracur 1173 (All Ciba Specialities) 1.5 parts by wt

Formulation G provided an optical coating with a refractive index of 1.546 at 543 nm.

Formulation H

This formulation contained

Ebecryl 600 (bisphenol A epoxy diacrylate, UCB Chemicals), 62.5 parts by wt.

Hexane diol diacrylate, 37.5 parts by wt.

Irgacure 184 1.5 parts by wt

Irgacure 651 1.5 parts by wt

Daracur 1173 (All Ciba Specialities) 1.5 parts by wt

Formulation H provided an optical coating with a refractive index of 1.5516 at 543 nm.

Formulation I

This formulation contained

Ebecryl 600 (bisphenol A epoxy diacrylate, UCB Chemicals) 44.5 parts by wt

Ebecryl 285 (75/25 aliphatic urethane acrtylate/tripropylene gycol diacrylate, wt/wt, UCB Chemicals), 42.5 parts by wt Hexane diol dicarylate, 13.0 parts by wt This gives 100 parts. In addition Irgacure 184 1.5 parts by wt Irgacure 651 1.5 parts by wt Daracur 1173 (All Ciba Specialties) 1.5 parts by wt Formulation I provided an optical coating with a refractive index of 1.536 at 543 nm.

Formulation J

This formulation contained

Fluorodimethacrylate 82.5 parts by wt.

Ethylene glycol dimethacrylate 17.5 parts by wt.

Irgacure 651, 1.5 parts by wt. (Ciba Speciality Chemicals)

Daracur 1173, 1.5 parts by wt.

Formulation J provided an optical coating with a refractive index of 1.459 at 1.3 μm.

Formulation K

This formulation contained

Fluorodimethacrylate 100 parts by wt.

Irgacure 651, 1.5 parts by wt. (Ciba Speciality Chemicals)

Daracur 1173, 1.5 parts by wt.

Formulation K provided an optical coating with a refractive index of 1.452 at 1.3 μm.

Formulation L

This formulation contained

Setacure 590 (melamine acrylate, Akros Chemicals) 50 parts by wt

Hexane diol diacrylate, 50 parts by wt

Irgacure 651, 3.0 parts by wt. (Ciba Speciality Chemicals)

Daracur 1173, 1.5 parts by wt. (Ciba Speciality Chemicals)

The viscosity of this formulation was approximately 1 Pa.sec at 25° C.

EXAMPLE 1

A flexible substrate comprising polyethylene terephthalate film (Melinex grade 506- Melinex is a tradename of Imperial Chemical Industries plc), 100 μm nominal thickness, was coated with Formulation A (50 μm wet coat thickness) using a No. 5K bar coater and partially UV cured using a Fusion Systems UV lamp type LXF300, fitted with a type D bulb model No. 1787 emitting in the range 200–880 nm with maximum output at 365 nm, providing 118W.cm−1 at the focal point.

Retaining features, in the form of channels, were then embossed into the partially cured film which was then further cured at 20° C. using the "Fusion Systems" UV source to form a first layer.

The retaining features were generally of a square cross-section (7.5 μm by 7.5 μm) in the form of a "Y" junction. The configuration of the "Y" junction is that shown in FIG. 2 wherein the two arms join the stem of the Y as "S" bends of curve radius 1 mm. Each of the arms and stem were of 40 mm in length.

The first layer was transferred to a table and held in position using a vacuum bed to form a supported film. The table was provided with a laminating roller (70 mm outside diameter including a 10 mm silicone rubber sleeve, width 64.5 mm) and a UV lamp (GEW serial No. 8428, type MD2-10 fitted with a type 708A.FCD lamp providing the same output and wavelength range as the Fusion Systems lamp above). Both the laminating roller and the UV lamp were able to traverse the length of supported film.

A line of contact was formed between a flexible dispensing layer of Melinex 400 film and the supported film. The UV lamp was positioned and the light therefrom focused (using a parabolic lens) such that illumination at a level of 120W.cm−1 occurred along the line of contact. The laminating roller was positioned along the line of contact and a load of 68 kg applied to the roller.

The laminating roller and the UV lamp traversed the length of the supported film at a rate of 0.5 m.s−1 such than an area of supported film of 65 mm by 65 mm was covered and during which time 0.2 g of resin of Formulation b was dispensed using a pipette to the line of contact between the first and second film.

The resin was thus squeezed across the surface of the supported film by the action of the roller thereby filling the retaining features and leaving only a small residual overlay of cured formulation B between the laminated supported film and the dispensing film. The conditions of the experiment were therefore such that the time for cure of the resin in the retaining feature approximated to the residence time of the laminated films in the nip of the laminating roller.

The dispensing layer was readily delaminated from the residual overlay. The overlay was then coated with a 50 $\mu$m thick layer of formulation A which was then partially UV cured using the GEW UV source. Fabrication was then completed by laminating a substrate of Melinex 505 film onto the partially cured layer of Formulation A which was then fully UV cured to produce a laminated product. The laminated product was then baked in an oven 80° C. for 18 hours before testing.

A sample of filled retaining feature was cut out of the baked laminated product and sectioned using a microtome. The thickness of the overlay in the microtomed sample was measured by optical microscopy to be 0.25±/–0.20 $\mu$m. The cross sectional dimensions were also measured to be:

depth 7.5 $\mu$m width at surface of first layer 7.4 $\mu$m

Width at bottom of channel 7.1 $\mu$m

The effective refractive index difference between the cured Formulation B in the retaining feature and the surrounding region was determined to be 0.007.

The "Y" shaped waveguides thus formed were prepared for optical characterisation by sandwiching them between two glass slides and microtoming the ends such that the end faces were perpendicular.

EXAMPLE 2

Comparative

The procedure of Example 1 was repeated except the UV curing of the resin in the retaining feature was performed using a lower intensity UV source (Model B-100A Blak Ray Ultraviolet lamp, UVP Inc. 200–880 nm with maximum output at 365 nm, providing 118W.cm−1 at the focal point.

Retaining features, in the form of channels, were then embossed into the partially cured film which was then further cured at 20° C. using the "Fusion Systems" UV source to form a f so as to form a thicker overlay.

The overlay thickness was measured subsequently determined and foudn to vary in the range 1.5 to 3.0 $\mu$m.

The wave guides formed in Example 1 and Example 2 were characterised using fibre coupling techniques using "pigtailed" laser diodes having wavelengths of around 1.3 and 1.55 $\mu$m (Northern Telecom LC71-18 (1.32 $\mu$m) and LC81-18 (1.552 $\mu$m)).

The output from the lasers were transmitted via a standard 9/125 $\mu$m silica monomode optical fibre, the end face of which was prepared using a standard fibre cleaving technique.

A sandwiched wave guide of Example 1 was mounted on a 4-axis manipulator stage (Photon Control DM2), whilst the end of the optical fibre was mounted on an adjacent manipulator block (Photon Control Microblock). The end of the optical fibre was then brought into alignment with the input face of the "Y" shaped waveguide.

The laser light was then coupled into the wave guide through a 2 to 10 mm wide air gap and was transmitted along the wave guide to the relevant output face. The light emitted from the output face was imaged using a microscope objective lens onto the sensing element of a vidicon camera (Electrophysics Micronviewer 7290). The lens was also mounted on a manipulator block in order to allow the appropriate section of the output face to be viewed.

The image received by the vidicon was inputted into an image capture board (Synoptics Synapse 768) mounted in a Nectar 486 computer running an image analysis programme (PC Image Plus, Foster Findlay Associates). The programme allows the relative intensities of different sections of the received image to be measured and plotted.

The output from the two arms of the "Y" shaped wave guide is shown in FIG. 3. The confinement of the light centered on the regions of the retaining features is clear. No significant light intensity is seen in the region between the two output peaks and the contrast ratio (as determined by the maximum intensity of the peaks divided by the maximum intensity between the peaks is in excess of 1000). Thus, little light is emitted from the overlay of the cured Formulation B resin.

In a further example, a straight wave guide prepared according to Example 1 showed a similar contrast ratio.

In comparison, FIG. 4 shows the results of characterising the "Y" shaped waveguide prepared according to Example 2. The contrast ratio of about 7 is principally due to the thicker overlay. Straight wave guides produced according to Example 2 also showed a reduced contrast ratio of between 5 to 100.

EXAMPLE 3

Example 1 was repeated except that Formulation C was used instead of Formulation B. The resulting laminated product had a similar thickness and variation in thickness to that of Example 1.

EXAMPLE 4

Example 2 was repeated except that Formulation D was instead of Formulation B. The filling of the retaining features was as described in Example 2. The resin in the retaining features was cured after the line of contact had passed over the filled portion of the retaining feature, thereby allowing the retained resin to partially relax out of the retaining feature, this resulted in the formulation of a very large overlay.

EXAMPLE 5

Example 1 was repeated except that Formulation E was used instead of Formulation B. An overlay comparable to that described in Example 1 was generated.

EXAMPLES 6(a), (b) AND (c)

Example 1 was repeated except that a multimode optical device was prepared comprising channels of 28 $\mu$m depth and of between 60 to 60 $\mu$m width. In Example 6(a), Formulation B was replaced by a resin comprising an epoxylated bis phenol Aa diacrylate having a refractive index of 1.5562 at 633 nm. In examples 6(b) and 6 (c) Formulation E 35 and F replaced Formulation B respectively.

In each of Example 6(a), (b) and (c) an overlay comparable to that of Example 1 was produced.

EXAMPLE 7

Example 1 was repeated except that a 1×8 passive splitter was formed and Formulation B was replaced by a resin comprising 90 parts by wt of HFG and 10 parts by wt of ethylene glycol dimethacrylate. An analysis comparable to that performed for Examples 1 and 2 was conducted and the results are as shown in FIG. 7. The best total loss for the configuration was 16.6+/−1.6 dB with an average loss of 17.3+/−2.7 dB.

EXAMPLE 8

This example describes the fabrication of a flexible multimode polymer waveguide component for visible light transmission.

A flexible first layer and a flexible dispensing layer were fabricated as follows. A flexible substrate comprising polyethylene terephthalate film (Melinex grade 505—Melinex is a tradename of Imperial Chemical Industries plc), 100 µm nominal thickness, was coated with formulation H.. using a bead coating method (coating speed 4 m/min) and UV cured using a Fusion Systems UV lamp type LXF300 fitted with a type D bulb model No. 1787 emitting in the range 200–880 nm with a maximum output at 365 nm, providing 118W.cm−1 at the focal point. The dry coat thickness was 21 µm for the first layer and 11 µm for the dispensing layer.

In the case of the first layer features in the form of channels, were then embossed into the partially cured film which was then further cured at 20° C. using the "Fusion Systems" UV source to form the first layer.

The retaining features were arranged in the form of straight, square cross-section (10 µm×10 µm), parallel lines on a 20 µm pitch.

The multimode waveguide was fabricated using the equipment and procedures described in example 1. The roller width was increased to 80 mm and the laminating roller and the UV lamp traversed the length of the supported film at a rate of 0.04 m.s−1 such that an area of the supported film approximately 100 mm×50 mm was covered and during which time 0.5 g of resin of formulation G was dispensed using a pipette to the line of contact between the first and second film.

A sample of the filled retaining features was cut out of the laminated product and sectioned using a microtome. The cross-section is shown in FIG. 11, where the waveguide width=10 µm, the waveguide depth=10 µm, and the waveguide pitch=20 µm. The thickness of the overlay was found to be less than 0.5 µm.

The waveguides were characterised using fibre coupling techniques with a white light source emitting light with wavelengths in the range 400 to 700 nm. The output from the white light source was transmitted via a standard 9/125 µm silica monomode optical fibre, the end face of which was prepared using a standard fibre cleaving technique. The end face of the fibre was butted up to the input face of one of the waveguides ad aligned with it. The light emitted from the output face of the waveguide laminate was imaged using a microscope objective lens onto a large area silicon photodiode detector. The power of the output light was measured. The sample was removed and the input fibre located in the same position as the output face of the waveguide device had been. The power from the input fibre was measured. The ratio of these two measurements gave the power loss in the waveguide device, including the losses due to coupling light in and out of the waveguide. By dividing the loss by the length of the device we were able to measure a loss per length of 0.6 dB.cm−1 and 675 nm and 1.1 dB.cm−1.

Example 8 was repeated using a different formulation for the core material (second layer) which gave a film of refractive index 1.549 at 543 nm. Formulation I was used for the buffer layers (first and third layers). This gave the same index difference as in Example 8. The waveguides produced were characterised using fibre coupling techniques with a white light source emitting light with wavelengths in the range 400 to 700 nm. The output from the white light source was transmitted via a standard 9/125 µm silica monomode optical fibre, the end face of which was prepared using a standard fibre cleaving technique. The end face of the fibre was butted up to the input face of one of the waveguides and aligned with it. The light emitted from the output face of the waveguide laminate was imaged using a microscope objective lens onto a large area silicon photodiode detector. The power of the output light was measured. The sample was removed and the input fibre located in the same position as the output face of the waveguide device had been. The power from the input fibre was measured. The ratio of these two measurements gave the power loss in the waveguide device, including the losses due to coupling light in and out of the waveguide. By dividing the loss by the length of the device we were able to measure a loss per length of 0.6 dB.cm−1 at 675 nm and 1.1 dB.cm−1.

EXAMPLE 11

This example illustrates the effect of overlayer thickness on the performance of a single mode directional coupler waveguide device. An optical model of the directional coupler structure was set up. The waveguide cross-section was 7.5 µm×7.5 µm with an overlayer of thickness x µm. The value of x was varied in the calculations. The refractive index of the buffer layers was taken to be 1.4499. The directional coupler device was 4 mm long with a 150 mm bend radius on the inputs and outputs to the coupler. The coupler gap was varied in the range from 5 to 11 µm. A 2-dimensional finite difference method was used to calculate the propagation constants of the guided modes of the structure. From the difference between the propogation constants of the odd and even modes and the length of the coupler, the splitting ratio =/× (through to cross state ratio) was calculated for an index difference of 0.004. The calculation was performed at two wavelengths; 1.3 and 1.55 µm. In the first calculation, the overlayer thickness, x, was set to 1.5 µm and then 2.0 µm. The results of this calculation are shown in FIG. 13. The results show that the 50:50 splitting point of the coupler has been shifted from the designed point with no overlayer (7–8 µm gap) to the 8–9 µm region (at 1.3 µm). Also, there is a large variation in the split ratio for a given coupler spacing as the overlayer varies between 1.5 µm and 2.0 µm. This would result in a large variation in the output split values. In order to achieve ≦0.7 dB variation, the overlayer thickness would have to be controlled to 1.75 µm±0.1 µm.

The process control would not have to be so accurate if the overlayer thickness could be kept down however. FIG. 14 shows how the output ratio varies for overlayer thicknesses 0 and 0.5 µm. The 50:50 coupling point is now back in the 7–8 µm region and there is much less variation in the output ratio with overlayer thickness. In fact it is now ≦0.7 dB.

The conclusion from this modelling work is that the overlayer thickness should be reduced to 0.25±0.25 µm for the device to perform correctly.

EXAMPLE 12

This example describes a flexible polymer monomode 1×8 power splitter device with passively aligned input and output fibres. A silicon master plate with the combined waveguides and v-grooves was produced by CVD (Chemical vapour phase deposition) of silica, reactive ion etching to define the waveguide channels and the mask for the v-grooves and wet etching in Caesium Hydroxide to define the v-grooves. The width of the v-grooves was chosen to set their depth after etching so that the core of a singlemode 9/125 optical fibre, sitting in the groove, would align with the centre of the 6.5 μm square waveguide cross-section. The lateral alignment of the v-grooves and waveguides was guaranteed to be very good as they were defined on the same photomask.

The 1×8 power splitter devices were 1.5 cm long and the splitters were formed using s-bend y-branches with a radius of curvature of 25 mm. The waveguide cross-section was 6.5 μm×6.5 μm.

A nickel master was grown by electroforming from the master plate. Polymer castings were made from the nickel shim and the ends of the v-grooves trenched using a cutting tool mounted on a microtome machine. A nickel embossing shim was grown from the trenched casting.

A structure of the type shown in FIG. 10 was fabricated using the method described in Example 1 and the above nickel embossing shim, except that the thickness of the first polymer layer was chosen to be 120 μm so as to allow for the depth of the v-grooves. Also, formulations J and K were used for the waveguide core and buffer so as to give an index difference of 0.75%. Also, the optical fibres, in the form of 8-fibre ribbon on a 250 μm pitch, were inserted into the v-grooves at either end of the waveguide device and clamped in position prior to filling of the waveguides. Also, the width of the flexible dispensing layer was adjusted so that it just covered the gap between the optical fibres on either side. In this way, the height of the fibres above the surface of the first polymer layer did not disrupt the filling process. The act of filling the waveguides also glued the ends of the fibres to the ends of their corresponding waveguides.

FIG. 15 shows an overhead view of an 8-fibre ribbon aligned and glued to the output of a 1×8 power splitter device. The passive fibre coupled device was tested by end firing light from a singlemode 1.32 micron diode laser into the input fibre to the 1×8 device and measuring the output fibres with a camera, as described in Example 2. The total channel loss, including end-fire insertion loss, insertion losses into and out of the device and waveguide loss, was estimated to be 36 dB on average.

EXAMPLE 13

This example describes a process for the continuous reel to reel manufacture of a flexible polymer laminate containing optical waveguide devices. Example 1 describes how the first layer with the embossed waveguide features was transferred to a table and held in position using a vacuum bed to form a support film before it was filled using a second polymer resin dispensed into the line of contact between it and a flexible dispensing layer. We have also been able to manufacture the waveguide laminate by a continuously running reel to reel process. The configuration of the rollers, films and lamp used is shown in FIG. 16.

The first polymer layer on a 100 μm thick flexible substrate ad the flexible dispensing film were made as described in Example 1 except the coating was done by bead coating. The width of the film web was 0.3 m and the length of each film reel was 100 m. The embossed first polymer layer film reel was loaded into position 8. The reel of the flexible dispensing film was loaded into position 1. The films were fed together under the sealing roller (2) and then under the nip rollers (3 and 6), around the laminating roller (4) and the laminate was reeled up on the take up reel (7). A line of contact was formed between the flexible dispensing film and the embossed film. The UV lamp (5) was positioned and the light therefrom focussed (using a parabolic mirror) such that the illumination at a level of 120W.cm−1 occurred along the line of contact. A load of 68 kg was applied to the nip rollers.

The films were fed at a rate of 1 m.min−1 round the laminating roller and the UV lamp turned on. Resin of formulation L was dispensed continuously into the line of contact between the two films. The resin was thus squeezed across the surface of the embossed film by the action of the roller thereby filling the retaining features and leaving only a small residual overlay of cured formulation L between the laminated supported film and the dispensing film. The conditions of the experiment were such that the time for cure of the resin in the retaining feature approximated to the residence time of the laminated films in the nip of the laminating roller.

EXAMPLE 15

As example 14 except the flexible dispensing film was made using 100 μm thick Melinex PET, grade 400 as the substrate. This grade does not have any adhesion enhancing coating on the film. After the laminate was reeled up, we were able to remove the Melinex PET grade 400 film from the laminate.

What is claimed is:

1. Polymer thin film comprising at least one polymeric structure for use as an organic optical component
   which thin film comprises
   (a) a first layer of an optically transmissive first polymer having a first refractive index, the first layer having a surface in which is defined at least one retaining feature adapted to retain a polymer therein;
   (b) a retention layer of an optically transmissive UV curable second polymer retained within the at least one retaining feature, the second polymer having a second refractive index which is greater than the first refractive index; characterised by
   (c) an overlay of the second polymer over the first layer adjacent the at least one retaining feature, the overlay having thickness in the range 0.001 μm to 1.5 μm over the surface of the first layer.

2. Polymer thin film as claimed in claim 1 which thin film comprises additionally
   (d) a second layer of an optically transmissive third polymer having a first refractive index which is less than the second refractive index and which second layer contacts the second polymer retained within the at least one retaining feature and the surface of the first layer
   wherein the organic feature and the surface of the first layer wherein the organic optical component exhibits an optical loss of less than 2.0 dB cm$^{-1}$ at at least one wavelength in the range 300 to 1600 nm.

3. Polymer film as claimed in claim 1 which is flexible in manner to be wound onto a reel and which is in the form of an elongate film of length in excess of 2 mm, or portion thereof.

4. Polymer film as claimed in claim 1 of length in excess of 10 m; or portion thereof.

5. Polymer film as claimed in claim 1 wherein the overlay thickness is selected according to the wavelength of light to be transmitted, for mono or multimode operation.

6. Polymer film as claimed in claim 1 wherein the overlay has a minimum and maximum thickness in the range 0–1.5 μm, the maximum not exceeding the selected thickness as defined in claim 5.

7. Polymer film as claimed in claim 1 which is part of a composite with one or more additional polymer films as defined in claim 1 forming a composite optical system.

8. Polymer film as claimed in claim 7 wherein the at least one optical structure comprises an integral positioning aid for positioning in optical communication with a further optical structure.

9. Polymer film as claimed in claim 1 which is a portion of a film of length in excess of 2 m which comprises a precision (laser) cut.

10. Polymer film as claimed in claim 1 wherein the first layer (2) is supported by a substrate which is removable from the first layer.

11. Polymer film as claimed in claim 1 wherein the first and second polymers independently are formed from a resin selected from the group consisting of substituted and unsubstituted polyimides, polycarbonates, siloxanes, acrylates and methacrylates, multifunctional derivatives and mixtures thereof.

12. Polymer film as claimed in claim 1 wherein the second polymer is formed from a resin derived from one or more monomers selected from the group consisting of ethyleneglycol dimethacrylate, tetrafluoropropylmethacrylate, pentafluorophenylmethacrylate, tetrachloroethylacrylate, bis (oxyethyl methacrylate) hexafluoroglutarate, ethyleneglycol dimethacrylate and multifunctional derivatives of triazine and phosphazene including tris (oxyethyl methacrylate) triazine.

13. Polymer film as claimed in claim 1 wherein the refractive index of the first and second polymer is modified by inclusion of an additive, or by using mixtures of resins to achieve a desired refractive index.

14. Polymer film as claimed in claim 1 wherein at least one retaining feature has at least one dimension in the range 1 to 250 $\mu$m.

15. Polymer film as claimed in claim 14 wherein the at least one dimension is in the range 5 to 50 $\mu$m.

16. Polymer film as claimed in claim 14 wherein the at least one dimension is in the range 1 to 10 $\mu$m.

17. Polymer film as claimed in claim 14 wherein the at least one dimension is in the range 5 to 10 $\mu$m.

18. Polymer film as claimed in claim 14 wherein the at least one dimension is in the range 1 to 5 $\mu$m.

19. Polymer film as claimed in claim 1 wherein said organic optical component comprises at least one optical waveguide.

20. A method for preparing a polymer thin film comprising at least one polymeric structure for use as an organic optical component which thin film has
(a) a first layer of an optically transmissive first polymer having a first refractive index, the first layer having a surface in which is defined at least one retaining feature adapted to retain a polymer therein;
(b) a retention layer of an optically transmissive UV curable second polymer retained within the at least one retaining feature, the second polymer having a second refractive index which is greater than the first refractive index;
(c) an overlay of the second polymer adjacent the at least one retaining feature, the overlay having thickness in the range 0.001 $\mu$m to 1.5 $\mu$m over the surface of the first layer; and
(d) a flexible dispensing layer adjacent the surface of the first layer, wherein the overlay is between the flexible dispensing layer and the surface of the first layer,
said method comprising
(a1) forming a line of contact between the flexible dispensing layer and the surface of the first layer and progressively contacting the surface with the flexible dispensing layer such that the line of contact advances across the surface;
(b1) applying a sufficient amount of a resin between the flexible dispensing layer and the first layer along the line of contact, wherein the resin is capable of being cured to form the second polymer to substantially fill the at least one retaining feature;
(c1) applying sufficient pressure along the line of contact such that (1) substantially all of the resin which is surplus to that required to fill the at least one retaining feature at the line of contact progresses with the advancing line of contact thereby filling the at least one retaining feature with resin; and
(2) no more than a quantity of resin capable of forming the overlay of second
polymer passes the line of contact and such that the resulting overlay has said thickness in the range 0.001 to 1.5 $\mu$m over the surface of the first layer; and
(d1) curing the resin filling the at least one retaining feature.

21. Method as claimed in claim 20 wherein the flexible dispensing layer remains in contact with the first layer for at least a region following the line of contact.

22. Method as claimed in claim 21 wherein sufficient pressure is substantially throughout the region following the line of contact such that the resin fills the at least one retaining feature and forms the overlay in manner conferred by the applied pressure without relaxation or distortion thereof.

23. Method as claimed in claim 21 wherein the resin is cured as it passes the line of
contact or in the region following the line of contact.

24. Method as claimed in claim 21 wherein the resin is capable of being cured by means of a suitable source of light, wherein the dispensing layer is transparent to the light used and the light is shown through the dispensing layer towards the resin at a given angle of incidence of the light onto the line of contact or in the region following the line of contact.

25. Polymer thin film comprising at least one polymeric structure for use as an organic optical component
which thin film comprises
(a) a first layer of an optically transmissive first polymer having a first refractive index, the first layer having a surface in which is defined at least one retaining feature;
(b) an optically transmissive UV curable second polymer retained within the at least one retaining feature, the second polymer having a second refractive index which is greater than the first refractive index; characterised by
(c) an overlay of the second polymer having thickness in the range 0.001 $\mu$m to 1.5 $\mu$m over the surface of the first layer; wherein the film is obtained by
(a1) forming a line of contact between a flexible dispensing layer and the surface of the first layer and progressively contacting the surface with the flexible dispensing layer such that the line of contact advances across the surface;
(b1) applying sufficient of a resin, capable of being cured to form the second polymer and to substantially fill the at least one retaining feature, along the line of contact;
(c1) applying sufficient pressure along the line of contact such that
(1) substantially all of the resin which is surplus to that required to fill the at least one
retaining feature at the line of contact progresses with the advancing line of contact thereby filling the at least one retaining feature with resin; and
(2) no more than a quantity of resin capable of forming the overlay of second
polymer passes the line of contact; and
(d1) curing the resin filling the at least one retaining feature.

* * * * *